US012568356B2

(12) United States Patent
Yuan et al.

(10) Patent No.: US 12,568,356 B2
(45) Date of Patent: Mar. 3, 2026

(54) CAPABILITY REPORTING BASED ON WIRELESS DEVICE COOPERATION

(71) Applicant: QUALCOMM Incorporated, San Diego, CA (US)

(72) Inventors: Fang Yuan, Beijing (CN); Aleksandar Damnjanovic, Del Mar, CA (US); Shaozhen Guo, Beijing (CN); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 18/550,447

(22) PCT Filed: Apr. 29, 2021

(86) PCT No.: PCT/CN2021/090887

§ 371 (c)(1),
(2) Date: Sep. 13, 2023

(87) PCT Pub. No.: WO2022/226871

PCT Pub. Date: Nov. 3, 2022

(65) Prior Publication Data

US 2024/0155332 A1    May 9, 2024

(51) Int. Cl.
*H04W 8/24* (2009.01)
*H04W 88/02* (2009.01)

(52) U.S. Cl.
CPC .................................... *H04W 8/24* (2013.01)

(58) Field of Classification Search
CPC .......... H04W 8/22; H04W 8/24; H04W 4/08; H04W 92/18

(Continued)

(56) References Cited

U.S. PATENT DOCUMENTS

| | | | |
|---|---|---|---|
| 9,237,440 B2 | 1/2016 | Geirhofer et al. | |
| 2009/0011783 A1* | 1/2009 | Kitazoe ................... | H04W 8/22 |
| | | | 455/517 |

(Continued)

FOREIGN PATENT DOCUMENTS

| | | |
|---|---|---|
| CN | 102300328 A | 12/2011 |
| CN | 104919718 A | 9/2015 |

(Continued)

OTHER PUBLICATIONS

IP.com search History (Year: 2025).*

(Continued)

*Primary Examiner* — Moustapha Diaby
(74) *Attorney, Agent, or Firm* — QUALCOMM Incorporated

(57) ABSTRACT

Methods, systems, and devices for wireless communications are described. A UE may cooperate with a group of one or more other UEs, where the UEs may each operate as a panel in a wireless communications system. To ensure updated information based on the cooperation status of the UE is provided to a network, the UE may receive one or more capability request messages from a base station. The UE may determine a group cooperation capability of the UE, based on a current group cooperation status of the UE. The group cooperation status may be based on the UE operating in cooperation with a group of UEs for communicating with the base station. The UE may then transmit, to the base station, one or more messages indicating the group cooperation capability of the UE.

30 Claims, 16 Drawing Sheets

(58) Field of Classification Search

USPC .......................................................... 455/419

See application file for complete search history.

(56) References Cited

U.S. PATENT DOCUMENTS

| | | | | |
|---|---|---|---|---|
| 2016/0337936 | A1* | 11/2016 | Li | H04W 8/005 |
| 2017/0347338 | A1* | 11/2017 | Chen | H04W 76/14 |
| 2018/0027429 | A1* | 1/2018 | Li | H04W 8/24 |
| | | | | 455/426.1 |
| 2018/0084539 | A1 | 3/2018 | Kubota et al. | |
| 2018/0110037 | A1* | 4/2018 | Yasukawa | H04W 48/16 |
| 2020/0068580 | A1* | 2/2020 | Tang | H04W 76/14 |
| 2020/0092685 | A1* | 3/2020 | Fehrenbach | H04W 72/23 |
| 2020/0413247 | A1* | 12/2020 | Van Lieshout | H04W 8/08 |
| 2023/0126503 | A1* | 4/2023 | Ökvist | H04W 76/14 |
| | | | | 375/267 |

FOREIGN PATENT DOCUMENTS

| | | | |
|---|---|---|---|
| CN | 106211026 | A | 12/2016 |
| CN | 107925870 | A | 4/2018 |
| WO | WO-2014113137 | A1 | 7/2014 |
| WO | WO-2020091270 | A1 | 5/2020 |
| WO | WO-2020226389 | A1 | 11/2020 |
| WO | WO-2020230201 | A1 | 11/2020 |

OTHER PUBLICATIONS

International Search Report and Written Opinion—PCT/CN2021/090887—ISA/EPO—Jan. 26, 2022.

Samsung: "Solution for Key Establishment Between the Remote UE and UE-to-Network Relay", 3GPP TSG SA WG3 (Security) Meeting#79, S3-151398, Apr. 20-24, 2015 Nanjing (China), Apr. 30, 2015, the whole document, 3 Pages.

Supplementary European Search Report—EP21938353—Search Authority—Munich—Dec. 9, 2024.

* cited by examiner

510

520

515

505

500

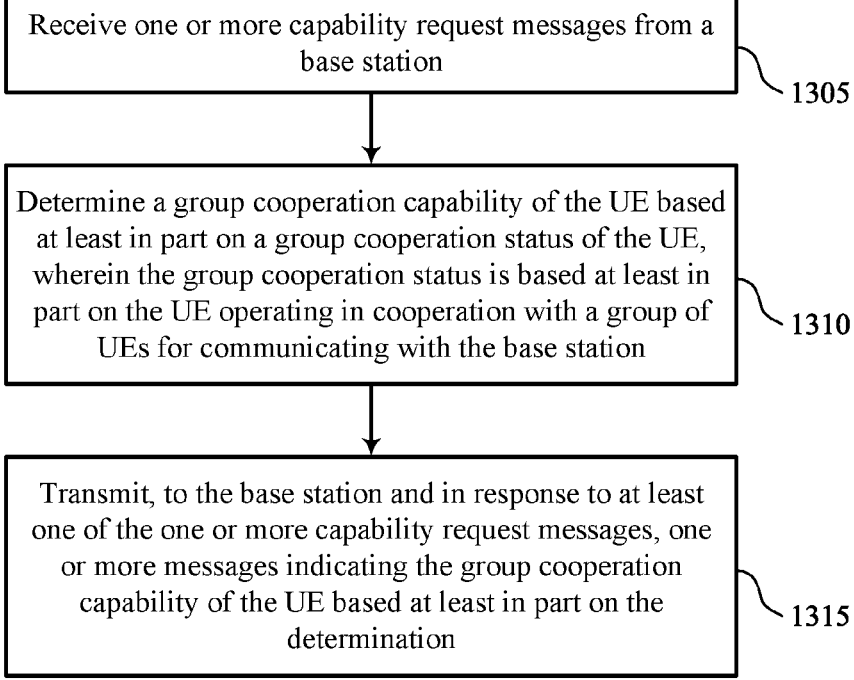

Receive one or more capability request messages from a base station ⌐ 1305

Determine a group cooperation capability of the UE based at least in part on a group cooperation status of the UE, wherein the group cooperation status is based at least in part on the UE operating in cooperation with a group of UEs for communicating with the base station ⌐ 1310

Transmit, to the base station and in response to at least one of the one or more capability request messages, one or more messages indicating the group cooperation capability of the UE based at least in part on the determination ⌐ 1315

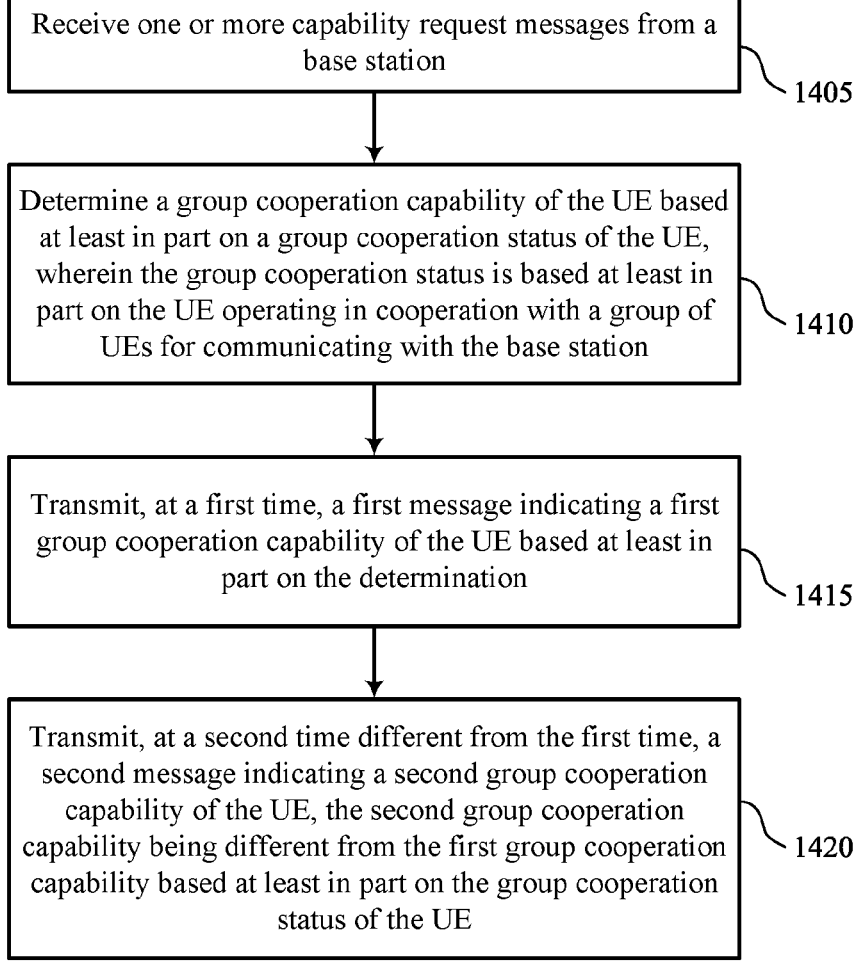

Receive one or more capability request messages from a base station
1405

Determine a group cooperation capability of the UE based at least in part on a group cooperation status of the UE, wherein the group cooperation status is based at least in part on the UE operating in cooperation with a group of UEs for communicating with the base station
1410

Transmit, at a first time, a first message indicating a first group cooperation capability of the UE based at least in part on the determination
1415

Transmit, at a second time different from the first time, a second message indicating a second group cooperation capability of the UE, the second group cooperation capability being different from the first group cooperation capability based at least in part on the group cooperation status of the UE
1420

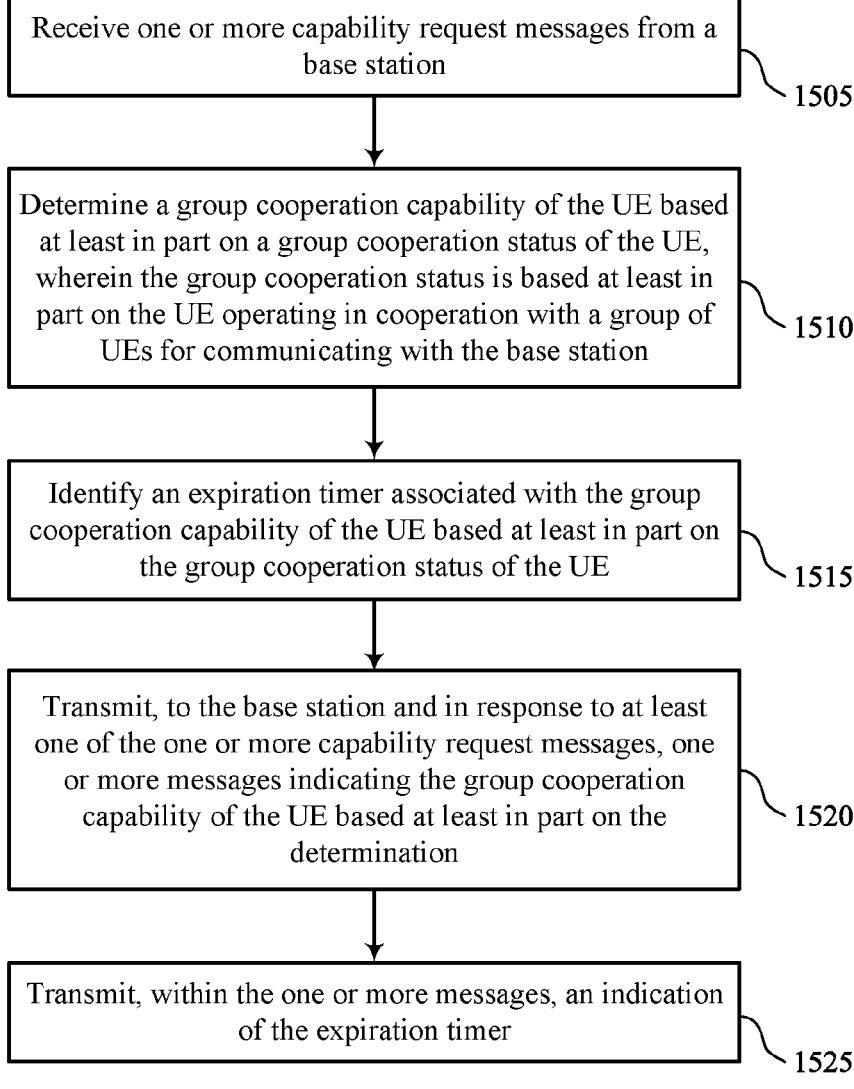

Receive one or more capability request messages from a base station

1505

Determine a group cooperation capability of the UE based at least in part on a group cooperation status of the UE, wherein the group cooperation status is based at least in part on the UE operating in cooperation with a group of UEs for communicating with the base station

1510

Identify an expiration timer associated with the group cooperation capability of the UE based at least in part on the group cooperation status of the UE

1515

Transmit, to the base station and in response to at least one of the one or more capability request messages, one or more messages indicating the group cooperation capability of the UE based at least in part on the determination

1520

Transmit, within the one or more messages, an indication of the expiration timer

CAPABILITY REPORTING BASED ON WIRELESS DEVICE COOPERATION

CROSS REFERENCE

The present application is a 371 national stage filing of International PCT Application No. PCT/CN2021/090887 by YUAN et al. entitled "CAPABILITY REPORTING BASED ON WIRELESS DEVICE COOPERATION," filed Apr. 29, 2021, which is assigned to the assignee hereof, and which is expressly incorporated by reference in its entirety herein.

FIELD OF TECHNOLOGY

The following relates to wireless communications, including capability reporting based on wireless device cooperation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may communicate with multiple UEs that act or otherwise function as a set of distributed panels. The multiple UEs may regularly communicate with each other or may cooperatively function together (for example, as a unit) and may function as a set of distributed panels based on such regular communication or cooperative function. In some examples, the cooperation of the UEs may be enabled through one or more communication links (e.g., sidelink communication links) between the UEs. These communication links, however, may have a varying quality, which may impact the ability of one or more UEs to perform in a cooperative manner.

SUMMARY

The described techniques relate to improved methods, systems, devices, and apparatuses that support capability reporting based on wireless device cooperation. Generally, the described techniques provide for dynamic signaling of UE capability information in a wireless communications system based on whether a UE is cooperating other UEs. For example, a UE may cooperate with a group of one or more other UEs, where the UEs may each operate as a panel in a wireless communications system. To ensure updated information is provided to a base station based on the cooperation status of the UE, the UE may receive one or more capability request messages from the base station, and the UE may transmit one or more messages indicating the UE's capabilities based on the cooperation status of the UE. In such cases, the UE may determine a group cooperation capability based on a current group cooperation status of the UE, where the group cooperation status may be based whether the UE is operating in cooperation with the group of UEs for communicating with the base station. In one example, a first group cooperation status (and corresponding capability) may be associated with the UE operating in cooperation with at least one other UE, whereas a second, different group cooperation status (and corresponding capability) may correspond to the UE not cooperating with other UEs. The UE may then transmit, to the base station, one or more messages indicating the group cooperation capability of the UE.

A method for wireless communications at a user equipment (UE) is described. The method may include receiving one or more capability request messages from a base station, determining a group cooperation capability of the UE based on a group cooperation status of the UE, where the group cooperation status is based on the UE operating in cooperation with a group of UEs for communicating with the base station, and transmitting, to the base station and in response to at least one of the one or more capability request messages, one or more messages indicating the group cooperation capability of the UE based on the determination.

An apparatus for wireless communications at a UE is described. The apparatus may include a processor, memory coupled with the processor, and instructions stored in the memory. The instructions may be executable by the processor to cause the apparatus to receive one or more capability request messages from a base station, determine a group cooperation capability of the UE based on a group cooperation status of the UE, where the group cooperation status is based on the UE operating in cooperation with a group of UEs for communicating with the base station, and transmit, to the base station and in response to at least one of the one or more capability request messages, one or more messages indicating the group cooperation capability of the UE based on the determination.

Another apparatus for wireless communications at a UE is described. The apparatus may include means for receiving one or more capability request messages from a base station, means for determining a group cooperation capability of the UE based on a group cooperation status of the UE, where the group cooperation status is based on the UE operating in cooperation with a group of UEs for communicating with the base station, and means for transmitting, to the base station and in response to at least one of the one or more capability request messages, one or more messages indicating the group cooperation capability of the UE based on the determination.

A non-transitory computer-readable medium storing code for wireless communications at a UE is described. The code may include instructions executable by a processor to receive one or more capability request messages from a base station, determine a group cooperation capability of the UE based on a group cooperation status of the UE, where the group cooperation status is based on the UE operating in cooperation with a group of UEs for communicating with the base station, and transmit, to the base station and in response to at least one of the one or more capability request messages, one or more messages indicating the group cooperation capability of the UE based on the determination.

In some examples of the method, apparatuses, and non-transitory computer-readable medium described herein, transmitting the one or more messages indicating the group cooperation capability of the UE may include operations, features, means, or instructions for transmitting, at a first time, a first message indicating a first group cooperation capability of the UE and transmitting, at a second time different from the first time, a second message indicating a second group cooperation capability of the UE, the second group cooperation capability being different from the first group cooperation capability based on the group cooperation status of the UE.

In some examples of the method, apparatuses, and non-transitory computer-readable medium described herein, the first group cooperation capability may be based on the group cooperation status corresponding to the UE operating non-cooperatively with the group of UEs and the second group cooperation capability may be based on the group cooperation status corresponding to the UE operating cooperatively with at least one UE of the group of UEs.

Some examples of the method, apparatuses, and non-transitory computer-readable medium described herein may further include operations, features, means, or instructions for transmitting, within the one or more messages, an indication of a varying capability indicator based on the group cooperation status of the UE, where the varying capability indicator indicates to the base station that the group cooperation capability of the UE varies over time.

Some examples of the method, apparatuses, and non-transitory computer-readable medium described herein may further include operations, features, means, or instructions for receiving one or more additional capability request messages from the base station based on transmitting the indication of the varying capability indicator.

Some examples of the method, apparatuses, and non-transitory computer-readable medium described herein may further include operations, features, means, or instructions for identifying an expiration timer associated with the group cooperation capability of the UE based on the group cooperation status of the UE and transmitting, within the one or more messages, an indication of the expiration timer.

Some examples of the method, apparatuses, and non-transitory computer-readable medium described herein may further include operations, features, means, or instructions for receiving a second capability request from the base station based on an expiration of the expiration timer.

Some examples of the method, apparatuses, and non-transitory computer-readable medium described herein may further include operations, features, means, or instructions for receiving a second capability request message from the base station, where the second capability request message includes an indication for the UE to transmit the one or more messages indicating the group cooperation capability of the UE periodically and transmitting the one or more messages indicating the group cooperation capability of the UE, where the one or more messages may be transmitted periodically based on receiving the second capability request message.

Some examples of the method, apparatuses, and non-transitory computer-readable medium described herein may further include operations, features, means, or instructions for receiving, from the base station, a first radio resource control (RRC) configuration, where the first RRC configuration may be associated with the group cooperation capability of the UE corresponding to the UE operating non-cooperatively with the group of UEs and receiving, from the base station, a second RRC configuration, where the second RRC configuration may be associated with the group cooperation capability of the UE corresponding to the UE operating cooperatively with the group of UEs.

In some examples of the method, apparatuses, and non-transitory computer-readable medium described herein, the first RRC configuration includes a first time alignment expiration timer and the second RRC configuration includes a second time alignment expiration timer different from the first time alignment expiration timer.

Some examples of the method, apparatuses, and non-transitory computer-readable medium described herein may further include operations, features, means, or instructions for reporting a first failure report in accordance with a first failure reporting procedure that may be based on the first RRC configuration and reporting a second failure report in accordance with a second failure reporting procedure that may be based on the second RRC configuration.

In some examples of the method, apparatuses, and non-transitory computer-readable medium described herein, a failure corresponding to the second RRC configuration may be reported in resources corresponding to the first RRC configuration.

In some examples of the method, apparatuses, and non-transitory computer-readable medium described herein, determining the group cooperation capability of the UE may include operations, features, means, or instructions for determining that the UE may be operating in cooperation with one or more UEs of the group of UEs for communicating with the base station, where the group cooperation capability of the UE corresponds to operating in cooperation with one or more UEs.

In some examples of the method, apparatuses, and non-transitory computer-readable medium described herein, determining that the UE may be operating in cooperation with the one or more UEs may include operations, features, means, or instructions for determining that the UE and the one or more UEs operate as a set of distributed panels.

Some examples of the method, apparatuses, and non-transitory computer-readable medium described herein may further include operations, features, means, or instructions for transmitting, to the base station, a request to enable or disable one or more parameters for communicating with the base station, where the request may be based on the group cooperation capability of the UE.

In some examples of the method, apparatuses, and non-transitory computer-readable medium described herein, transmitting the request may include operations, features, means, or instructions for transmitting the request to activate or deactivate a subset of a set of panels of the UE.

In some examples of the method, apparatuses, and non-transitory computer-readable medium described herein, transmitting the request may include operations, features, means, or instructions for transmitting the request to activate or deactivate a subset of a set of supported carriers of the UE, where the UE operating in accordance with a multiple carrier communications scheme.

In some examples of the method, apparatuses, and non-transitory computer-readable medium described herein, the request may be transmitted via layer 3 signaling to the base station, the request including UE assistance information.

In some examples of the method, apparatuses, and non-transitory computer-readable medium described herein, the request may be transmitted via layer 2 signaling to the base station, the request including a medium access channel control element report for panel activation, panel deactivation, or any combination thereof.

In some examples of the method, apparatuses, and non-transitory computer-readable medium described herein, the request may be transmitted via layer 1 signaling to the base station, the request including a cooperation failure report corresponding to an uplink control transmission, a random access transmission, or any combination thereof.

A method for wireless communications at a base station is described. The method may include transmitting a capability request message to a UE and receiving, from the UE and in response to the capability request message, one or more messages indicating a group cooperation capability of the UE, where the group cooperation capability of the UE is based on a group cooperation status of the UE and indicates whether UE is operating in cooperation with a group of UEs for communicating with the base station.

An apparatus for wireless communications at a base station is described. The apparatus may include a processor, memory coupled with the processor, and instructions stored in the memory. The instructions may be executable by the processor to cause the apparatus to transmit a capability request message to a UE and receive, from the UE and in response to the capability request message, one or more messages indicating a group cooperation capability of the UE, where the group cooperation capability of the UE is based on a group cooperation status of the UE and indicates whether UE is operating in cooperation with a group of UEs for communicating with the base station.

Another apparatus for wireless communications at a base station is described. The apparatus may include means for transmitting a capability request message to a UE and means for receiving, from the UE and in response to the capability request message, one or more messages indicating a group cooperation capability of the UE, where the group cooperation capability of the UE is based on a group cooperation status of the UE and indicates whether UE is operating in cooperation with a group of UEs for communicating with the base station.

A non-transitory computer-readable medium storing code for wireless communications at a base station is described. The code may include instructions executable by a processor to transmit a capability request message to a UE and receive, from the UE and in response to the capability request message, one or more messages indicating a group cooperation capability of the UE, where the group cooperation capability of the UE is based on a group cooperation status of the UE and indicates whether UE is operating in cooperation with a group of UEs for communicating with the base station.

In some examples of the method, apparatuses, and non-transitory computer-readable medium described herein, receiving the one or more messages indicating the group cooperation capability of the UE may include operations, features, means, or instructions for receiving, at a first time, a first message indicating a first group cooperation capability of the UE and receiving, at a second time different from the first time, a second message indicating a second group cooperation capability of the UE, the second group cooperation capability being different from the first group cooperation capability based on the group cooperation status of the UE.

In some examples of the method, apparatuses, and non-transitory computer-readable medium described herein, the first group cooperation capability may be based on the group cooperation status corresponding to the UE operating non-cooperatively with the group of UEs and the second group cooperation capability may be based on the group cooperation status corresponding to the UE operating cooperatively with at least one UE of the group of UEs.

Some examples of the method, apparatuses, and non-transitory computer-readable medium described herein may further include operations, features, means, or instructions for receiving, within the one or more messages, an indication of a varying capability indicator based on the group cooperation status of the UE, where the varying capability indicator indicates to the base station that the group cooperation capability of the UE varies over time and transmitting one or more additional capability request messages to the UE based on the varying capability indicator.

Some examples of the method, apparatuses, and non-transitory computer-readable medium described herein may further include operations, features, means, or instructions for receiving, within the one or more messages, an indication of an expiration timer corresponding to the group cooperation capability of the UE based on the group cooperation status of the UE and transmitting a second capability request to the UE based on an expiration of the expiration timer.

Some examples of the method, apparatuses, and non-transitory computer-readable medium described herein may further include operations, features, means, or instructions for transmitting a second capability request message to the UE, where the second capability request message includes an indication for the UE to transmit the one or more messages indicating the group cooperation capability of the UE periodically and receiving the one or more messages indicating the group cooperation capability of the UE, where the one or more messages may be received periodically based on transmitting the second capability request message.

Some examples of the method, apparatuses, and non-transitory computer-readable medium described herein may further include operations, features, means, or instructions for transmitting, to the UE, a first RRC configuration, where the first RRC configuration may be associated with the group cooperation capability of the UE corresponding to the UE operating non-cooperatively with the group of UEs and transmitting, to the UE, a second RRC configuration, where the second RRC configuration may be associated with the group cooperation capability of the UE corresponding to the UE operating cooperatively with the group of UEs, where the first RRC configuration includes a first time alignment expiration timer and the second RRC configuration includes a second time alignment expiration timer different from the first time alignment expiration timer.

Some examples of the method, apparatuses, and non-transitory computer-readable medium described herein may further include operations, features, means, or instructions for receiving, from the UE, a request to enable or disable one or more parameters for communicating with the UE, where the request may be based on the group cooperation capability of the UE.

BRIEF DESCRIPTION OF THE DRAWINGS

FIGS. 13 through 16 show flowcharts illustrating methods that support capability reporting based on wireless device cooperation in accordance with aspects of the present disclosure.

DETAILED DESCRIPTION

Figure 1:
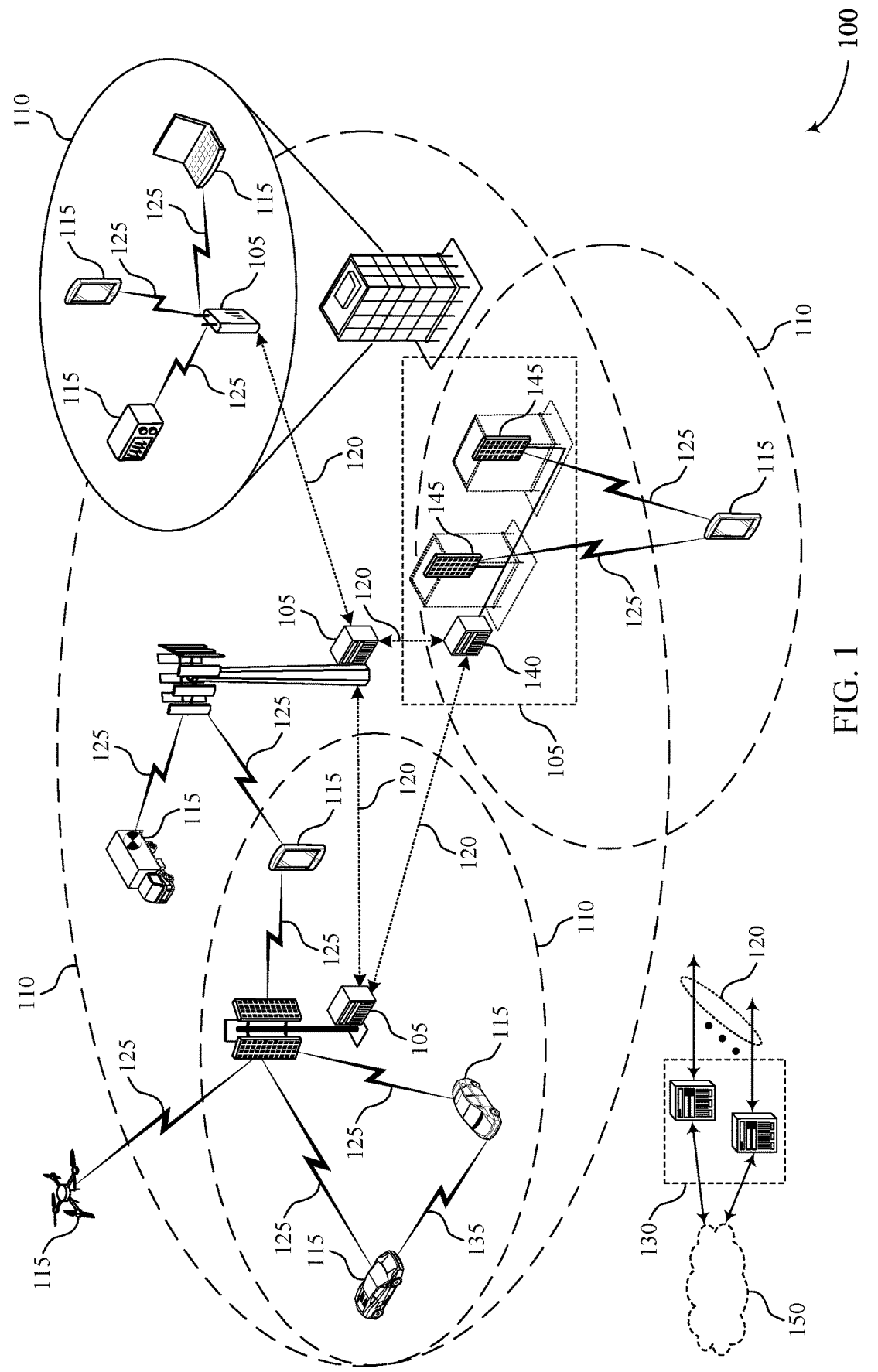
FIG. 1 illustrates an example of a wireless communications system that supports capability reporting based on wireless device cooperation in accordance with aspects of the present disclosure.

In a wireless communications system, a single UE may cooperate with other UEs in a group, such that each UE may act as an antenna of an antenna array, or a panel of a set of distributed panels, or the like. In one example, the group of UEs may cooperate together (e.g., combine antenna resources, share downlink information received from the network) to improve link reliability and throughput for at least one UE of the group. The UEs may communicate with each other in the cooperative mode, for example, using device-to-device or sidelink communications techniques. For example, the UEs may communicate with other UEs over sidelink communication channels. The sidelink communication links between the UEs, however, may have varying quality over time and, in some cases, a relatively reduced quality of one or more respective sidelinks between UEs may impact the ability of one or more UEs to cooperate. This interruption in cooperation may result in varying numbers of UEs cooperating at a given time.

As a result, the capabilities of a UE (e.g., based on whether the UE is cooperating with other UEs) may also vary over time, which may affect reliability and throughput. Further, the network may not be aware of the time-varying cooperation status of a UE. In turn, the network may also be unaware of the time-varying capabilities of the UE. This lack of information at the network may further impact communications efficiency in the system.

As described herein, to inform the network of accurate capability information of the UE, a UE in a group of UEs may dynamically indicate a capability of the UE. The capability of the UE may be based on whether the UE is operating cooperatively with other UEs in the group. For example, the UE may transmit, to a base station, an indication of a first capability that is indicative of cooperation with one or more other UEs. Then, at a different time, the UE may transmit another indication of a second capability that is indicative of the UE operating without the cooperation of the other UEs (e.g., operating on its own, operating in a non-cooperative mode). In either case, the UE's capability may change based on whether it is cooperating with other UEs (e.g., a greater/smaller number of panels may be available for receiving downlink communications, the UE may communicate using some different time/frequency resources or bandwidth, the UE may have different capabilities for switching bandwidth parts, among other examples).

Here, the first capability may correspond to an increased capability relative to the second capability, such as a relatively greater number of multiple-input, multiple-output (MIMO) layers supported by the UE and enabled by the cooperation. As such, the report provided to the base station may include an indication of whether the UE is currently cooperating in the group of UEs. In some examples, the base station may transmit a request for the UE capabilities, and the UE may transmit a capability report in response, indicating the UE's current capabilities based on whether the UE is cooperating in the group of UEs at that time. In some cases, the UE may report its capabilities with some periodicity, or the UE may include an indication to the base station that its capabilities vary with time, thereby triggering additional capability requests from the base station. In some cases, the base station may transmit a request for the UE to provide capability information in a periodic manner.

Additionally or alternatively, the UE may include, in transmissions to the base station, an indication of a timer that is based on the cooperation status of the UE. The base station may then request updated capability information from the UE upon expiration of the timer. The UE may also request to activate or deactivate one or more communications parameters (a number of panels, one or more carriers) based on its cooperation status.

Thus, the base station may be aware of dynamic changes to a capability of a UE to cooperate with other UEs in a group. The base station may then be consistently aware of cooperation changes within the group of UEs, and may be able to more efficiently support UE cooperation.

Aspects of the disclosure are initially described in the context of wireless communications systems. Aspects of the disclosure are then described with respect to process flows. Aspects of the disclosure are further illustrated by and described with reference to apparatus diagrams, system diagrams, and flowcharts that relate to capability reporting based on wireless device cooperation.

FIG. 1 illustrates an example of a wireless communications system 100 that supports capability reporting based on wireless device cooperation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a group of UEs 115 may regularly communicate with each other and function cooperatively (for example, as a unit). In such cases, each UE 115 of the group of UEs 115 may act or otherwise function as a distributed panel of a set of distributed panels and may receive at least some of the same control information as the other UEs 115 in the group of UEs 115. To ensure updated information based on the cooperation status of the UE 115 is provided to the network, the UE 115 may receive one or more capability request messages from a base station 105. Additionally or alternatively, the UE 115 may signal one or more capability messages (e.g., based on some periodicity, based on one or more additional requests from the base station, based on an expiration of a timer, or the like). In such cases, the UE 115 may determine a group cooperation capability of the UE 115 based on a current group cooperation status of the UE 115. The group cooperation status may be based on the UE 115 operating in cooperation with a group of UEs 115 for communicating with the base station 105. The UE 115 may then transmit, to the base station 105, one or more messages indicating the group cooperation capability of the UE 115. In some cases, the messages indicating the group cooperation capability of the UE 115 may indicate, to the network, whether the UE is cooperating with the UEs 115 of the group.

Figure 2:
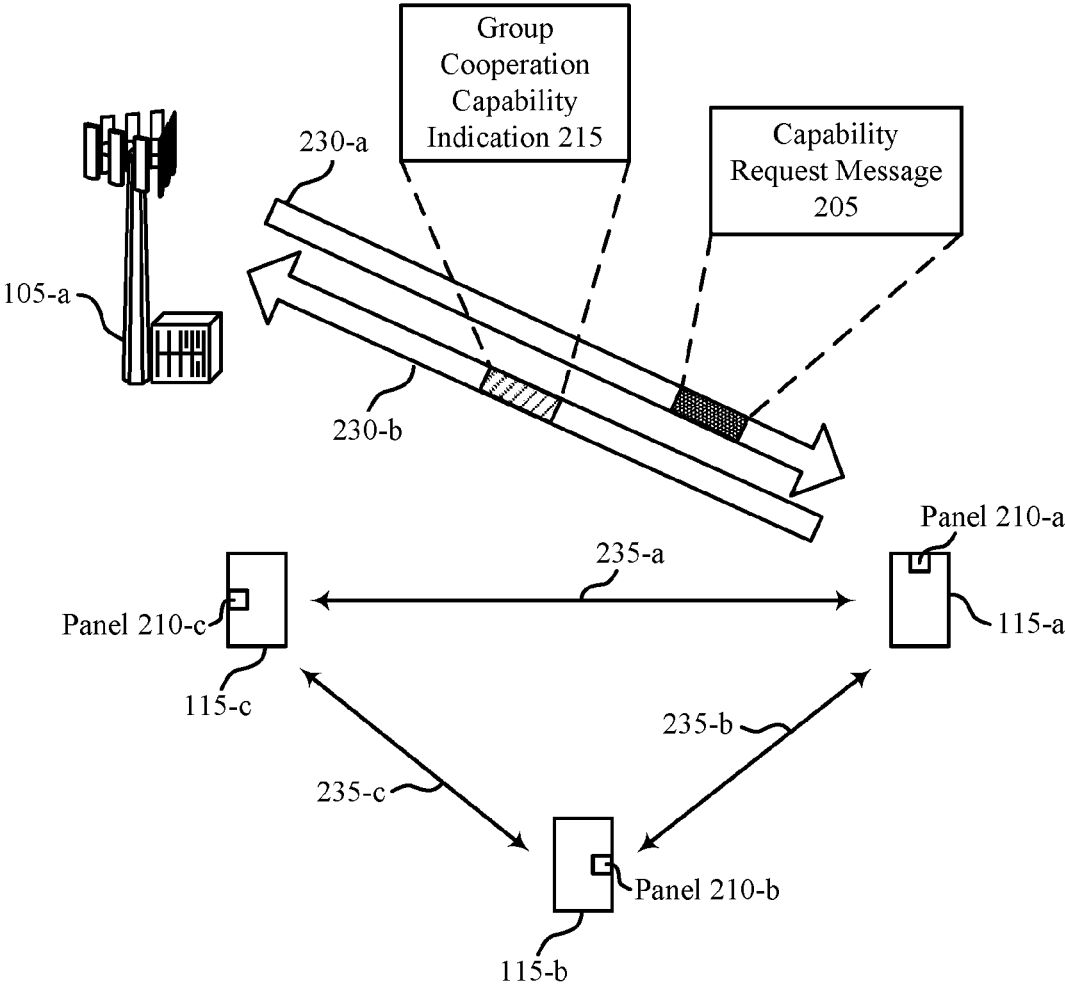
FIG. 2 illustrates an example of a wireless communications system that supports capability reporting based on wireless device cooperation in accordance with aspects of the present disclosure.

FIG. 2 illustrates an example of a wireless communications system 200 that supports capability reporting based on wireless device cooperation in accordance with aspects of the present disclosure. The wireless communications system 200 may include base station 105-*a* and a group of UEs 115, including a UE 115-*a*, a UE 115-*b*, and a UE 115-*c*. Base station 105-*a* and the group of UEs 115 may be examples of corresponding devices described with reference to FIG. 1. For example, base station 105-*a* may be an example of a base station 105 or a subcomponent of a base station 105, as described with reference to FIG. 1. Likewise, UEs 115-*a*, 115-*b*, or 115-*c* may be an example of a UE 115 or a subcomponent of a UE 115 described with reference to FIG. 1. In some examples, base station 105-*a* may be a transmission reception point (TRP).

In some examples, the group of UEs 115 may function or otherwise act as a set of distributed panels 210 and each UE 115 of the group of UEs 115 may communicate with the base station 105-*a* as a distributed panel 210 of the set of distributed panels 210. For example, the UE 115-*a* may communicate with base station 105-*a* via a panel 210-*a*, the UE 115-*b* may communicate with the base station 105-*a* via a panel 210-*b*, and the UE 115-*c* may communicate with base station 105-*a* via a panel 210-*c*, all of which may be used by the UEs 115 as distributed panels 210 of the set of distributed panels 210. Each of the UEs 115 may communicate with base station 105-*a* via a panel 210 using a communication link 230. For example, the UE 115-*a* may communicate with base station 105-*a* using a communication link 230-*a* (a downlink communication link) and a communication link 230-*b* (an uplink communication link). As illustrated in the wireless communications system 200, the communication links 230 may support both uplink and downlink communications. In some aspects, the communication links 230 may be examples of Uu links (e.g., a Uu interface) between base station 105-*a* and the UEs 115.

Additionally, the UEs 115 may communicate with each other via sidelinks 235 (e.g., sidelink communication links, a PC5 interface). For example, the UE 115-*a* and the UE 115-*b* may communicate using a sidelink 235-*b*, the UE 115-*b* and the UE 115-*c* may communicate using a sidelink 235-*c*, and the UE 115-*c* and the UE 115-*a* may communicate using a sidelink 235-*a*. In some examples, the UEs 115 may use sidelink communications to facilitate cooperative operation or functionality between the UEs 115. For example, the UEs 115 may be examples of wireless devices that are capable of cooperation or collaboration and, as such, may operate or function together (may perform similar or complimentary operations as a collective). For instance, the group of UEs 115 may function as a disaggregated UE, which may be different than a single UE 115 including co-located panels 210. The group of UEs 115 may be an example of a group of unmanned aerial vehicles (UAVs) (for example, drones), industrial devices, or any other devices that make operational decisions (such as driving, movement, or placement decisions) based on communication with other peer devices. In some aspects, the UEs 115 may function as the set of distributed panels 210 based on being capable of cooperative or collaborative functionalities. In other words, the basis on which the group of UEs 115 may function as a set of distributed panels may be related to the capability of the group of UEs 115 to cooperate or collaborate on operational decisions. In the group of UEs 115, a UE identity (ID) or identifier can be an explicit ID such as a radio network temporary identifier (RNTI) or an implicit ID that is associated with a channel ID or a reference signal ID. For example, any of a beam ID, a transmission configuration indicator (TCI) state ID, a spatial relationship information ID, a sounding reference signal (SRS) resource ID, or an SRS resource set ID may be used to identify a UE 115 within the group of UEs 115.

The ability of the UEs 115 to cooperate in the group of UEs 115 may depend on the quality of sidelinks 235. For example, if sidelink 235-*a* decreases in quality (e.g., due to range, interference, or other interruptions), one or both of UEs 115-*a* or 115-*c* may have difficulties cooperating in the group of UEs 115. In some examples, base station 105-*a* may not be aware of a change in the number of UEs 115 capable of cooperating in the group, which may vary over time. In addition, because a UE 115 may have a dynamically changing cooperation status, its capabilities (e.g., one or more parameters supported by the UE) for communicating with base station 105-*a* may also vary over time.

To ensure that base station 105-*a*, and thereby the network, is aware of the cooperation status in the group of UEs 115, base station 105-*a* may communicate with UEs 115 to request and receive dynamically updated indications of the cooperation statuses. Base station 105-*a* may transmit one or more capability request messages 205 to one or more UEs 115 (e.g., UE 115-*a*) that are capable of cooperating in the group of UEs 115. The one or more capability request messages 205 may be transmitted by base station 105-*a* without, for example, an RRC establishment or RRC re-establishment procedure between base station 105-*a* and UE 115-*a*.

Based on receiving the capability request message 205, UE 115-*a* may transmit a cooperation capability indication 215 (e.g., an indication of a group cooperation capability). The cooperation capability indication 215 may include general UE 115 capability information, with which base station 105-*a* may determine a cooperation capability of UE 115-*a*.

The cooperation capability indication 215 may also include specific cooperation capability information.

The capability of the UEs 115 to cooperate may be based on not only the quality of sidelinks 235, but also other communication parameters of the UEs 115. The communication parameters may include supported bandwidth, subcarrier spacing, HARQ process formatting, physical uplink control channel (PUCCH) formatting, frequency hopping, physical uplink shared channel (PUSCH) repetition format, MIMO layers, and multiple other communication parameters. The cooperating capability indication 215 provided by the UE 115 may include any combination of capabilities of the UE 115 as reported in general and specific capability information.

In some cases, UE 115-*a* may have a capability to cooperate that may vary over time. In these cases, UE 115-*a* may transmit multiple cooperation capability indications 215. For example, at a first time occasion, UE 115-*a* may transmit cooperation capability indication 215 indicating support for a number of MIMO layers (e.g., two MIMO layers), which may implicitly indicate that UE 115-*a* is not cooperating. In a second time occasion, UE 115-*a* may transmit a second cooperation capability indication indicating support for a different number of MIMO layers (e.g., four MIMO layers), which may implicitly indicate that UE 115-*a* is cooperating with one or more other UEs 115 (e.g., UE 115-*b* or UE 115-*c*, or both).

In some cases, UE 115-*a* may report, in cooperation capability indication 215, that the capabilities of UE 115-*a* may vary over time. For instance, UE 115-*a* may include an indicator that signals to base station 105-*b* that the capabilities of UE 115-*a* vary over time. For example, the indicator may be a one-bit flag. In some aspects, base station 105-*a* may transmit an additional capability request message indicating for UE 115-*a* to periodically transmit updated cooperation capability indications 215. In some other aspects, base station 105-*a* may transmit additional capability request messages to UE 115-*a*, such that base station 105-*a* may receive updated cooperation capability indications 215 on demand. When UE 115-*a* reports the capabilities of UE 115-*a* over time, UE 115-*a* may not expect to perform an RRC establishment or RRC re-establishment procedure with base station 105-*a*.

In some cases, UE 115-*a* may format cooperation capability indication 215 as a multi-level report. As an example, the cooperation capability indication 215 may indicate two capabilities in two levels. The first level may include a non-cooperation-based UE capability (e.g., a capability of the UE 115-*a* when the UE is not cooperating with other UEs 115), and the second level may include a cooperation-based UE capability (e.g., a capability of the UE 115-*a* when the UE is cooperating with at least one other UE 115). In some examples, the second level may additionally or alternatively include an indicator of varying capability.

In some cases, UE 115-*a* may report an indication of a timer, where an expiration of the timer may indicate a time at which capabilities of UE 115-*a* may change. In such cases, the UE 115-*a* may determine the timer based on, for example, a number of other UEs 115 that UE 115-*a* may cooperate with, or a link quality with the other UEs 115, or any combination thereof. Base station 105-*a* may transmit an additional capability request message 205 upon expiration of the timer, and UE 115-*a* may transmit additional cooperation capability indications 215 in response (e.g., with updated capability information, with similar capability information as was previously reported, with different capability information, among other examples).

Additionally or alternatively, UE 115-*a* may be configured with multiple (e.g., two) levels of RRC configurations (e.g., UE 115-*a* may receive two RRC configurations from base station 105-*a*). For examples, a first level RRC configuration may be based on UE capabilities associated with non-cooperation, and a second level may be based on UE capabilities associated with cooperation. Each level may be associated with a respective time alignment expiration timer. Separate failure reports may be defined for each of the first and second RRC configurations. In some examples, UE 115-*a* may report the failure event for the second level of RRC configuration using resources based on the first level of RRC configuration.

Additionally or alternatively, UE 115-*a* may request to semi-statically enable or disable a support to the UE capability reported in group cooperation capability indication 215. For example, if UE 115-*a* reports a capability for a multi-panel operation, UE 115-*a* may transmit a request to activate or deactivate a subset of the reported supported set of panels. In another example, if UE 115-*a* reports a capability for a carrier aggregation operation, UE 115-*a* may request to activate or deactivate a subset of the reported supported number (e.g., maximum, threshold number) of carriers. These requests may be transmitted via layer 1 (L1), layer 2 (L2), or layer 3 (L3) signaling. In the case of L1 signaling, the request may include a failure report corresponding to an uplink control transmission, a random access transmission, or both. In the case of L2 signaling, the request may include a MAC-CE report for panel activation, panel deactivation, or a combination of these. In the case of L3, signaling, the request may include UE assistance information. It is noted that other examples of L1, L2, and L3 signaling may be used, and the examples provided herein should not be considered limiting to the scope covered by the claims or the disclosure.

Figure 3:
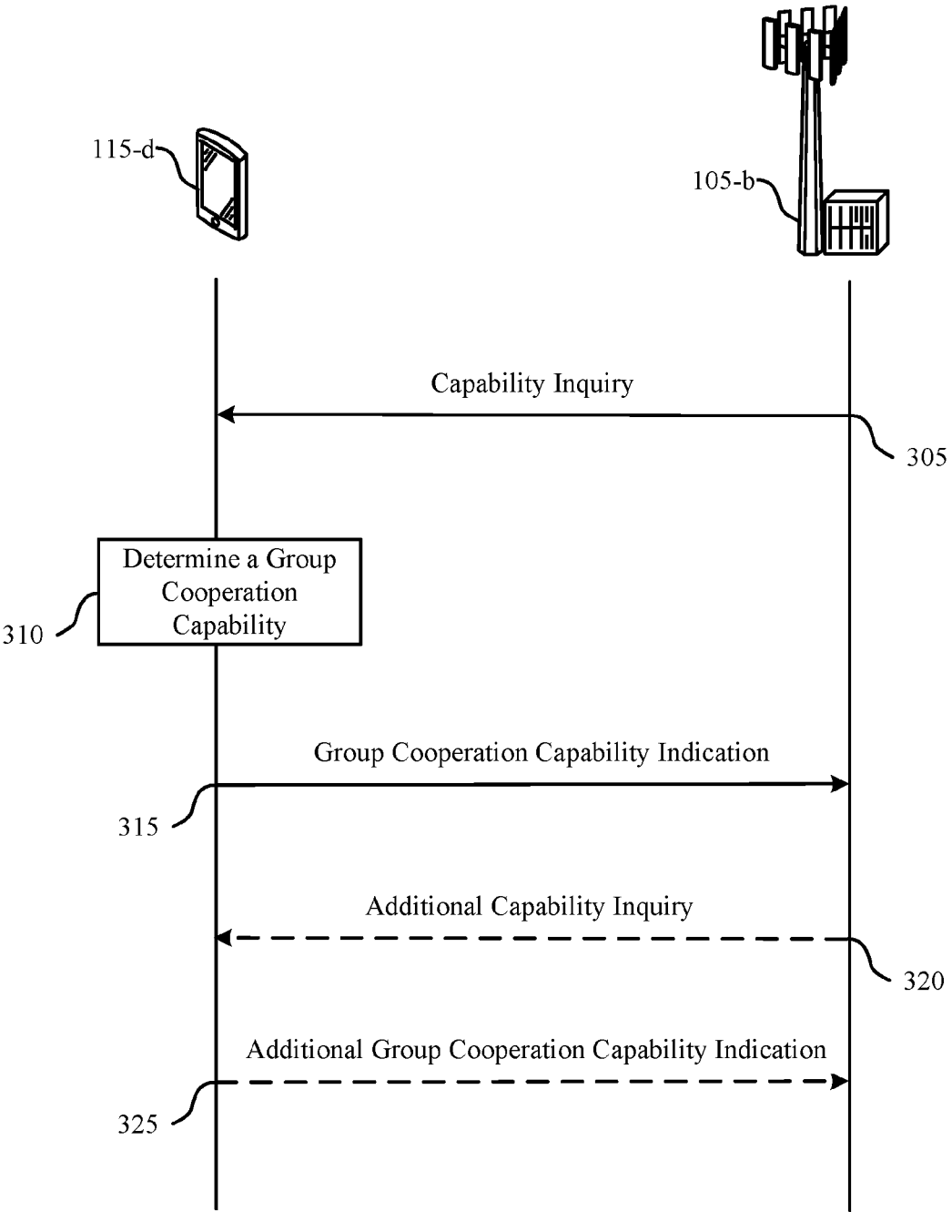
FIG. 3 illustrates an example of a process flow that supports capability reporting based on wireless device cooperation in accordance with aspects of the present disclosure.

FIG. 3 illustrates an example of a process flow 300 that supports capability reporting based on wireless device cooperation in accordance with aspects of the present disclosure. Process flow 300 may include base station 105-*b*, which may be an example of a base station 105 as described with respect to FIGS. 1 and 2. Base station 105-*b* may also be an example of a TRP. Process flow 300 also includes UE 115-*d*, which may be an example of a UE 115 as described with respect to FIGS. 1 and 2. UE 115-*d* may operate in a cooperative manner with one or more other UEs 115. UE 115-*d* and base station 105-*b* may communicate as part of a wireless communications system.

At 305, UE 115-*d* may receive one or more capability request messages from base station 105-*b*.

At 310, UE 115-*d* may determine a group cooperation capability of UE 115-*d* based on a group cooperation status of UE 115-*d*. The group cooperation status may be based on UE 115-*d* operating in cooperation with a group of UEs 115 for communicating with base station 105-*b*. UE 115-*d* may determine that UE 115-*d* is operating in cooperation with one or more UEs 115 of the group of UEs 115 for communicating with base station 105-*b*, where the group cooperation capability of UE 115-*d* corresponds to operating in cooperation with one or more UEs 115. UE 115-*d* may determine that UE 115-*d* and the one or more UEs 115 operate as a set of distributed panels.

At 315, UE 115-*d* may transmit, to base station 105-*b*, a group cooperation capability indication. UE 115-*d* may transmit the group cooperation capability indication in response to the capability request message received from base station 105-*d*. In some cases, UE 115-*d* may transmit, at a first time, a first group cooperation capability indication.

UE 115-*d* may also transmit, at a second time, a second group cooperation capability message. There may not be a RRC establishment or RRC re-establishment procedure that occurs between the time of the first group cooperation capability indication and the time of the second group cooperation indication. In some cases, the first group cooperation capability message may indicate UE 115-*d* operating non-cooperatively with the group of UEs 115 (e.g., where the group cooperation status includes UE 115-*d* operating non-cooperatively). In these cases, the second group cooperation capability message may indicate UE 115-*d* operating cooperatively with at least one UE 115 of the group of UEs 115 (e.g., where the group cooperation status corresponds to the UE operating cooperatively). In other cases, the first group cooperation capability message may indicate UE 115-*d* operating cooperatively with at least one UE 115 of the group of UEs 115 and the second group cooperation capability message may indicate UE 115-*d* operating non-cooperatively the group of UEs 115.

In some cases, UE 115-*d* may also transmit an indication of a varying capability indicator based on the group cooperation status of UE 115-*d*. The varying capability indicator may indicate to base station 105-*b* that the group cooperation capability of UE 115-*d* may vary over time.

In these cases, UE 115-*d* may receive one or more additional capability inquiries at 320. The additional capability inquiries may be based on UE 115-*d* transmitting the indication of the varying capability indicator. At 325, UE 115-*d* may transmit one or more group cooperation capability indication in response to the additional capability inquiry at 320.

Additionally or alternatively, UE 115-*d* may identify an expiration timer associated with the group cooperating capability of UE 115-*d*, based on the group-cooperation status of UE 115-*d*. In these cases, UE 115-*d* may transmit, within the one or more group cooperation capability indication (e.g., at 315 or 325), an indication of the expiration timer. UE 115-*d* may then receive an additional capability request inquiry (e.g., at 320, or later) based on the expiration of the expiration timer. At 325 or later, UE 115-*d* may transmit one or more group cooperation capability indication in response to the additional capability inquiry.

Additionally or alternatively, UE 115-*d* may receive an additional (e.g., second) capability request message from base station 105-*b* (e.g., at 320 or later), where the second capability request message includes an indication for UE 115-*d* to transmit the one or more group cooperation capability indications (e.g., at 325) periodically. UE 115-*d* may then transmit the additional one or more group cooperation capability indications periodically (e.g., at 325 and at periodic times after).

Figure 4:
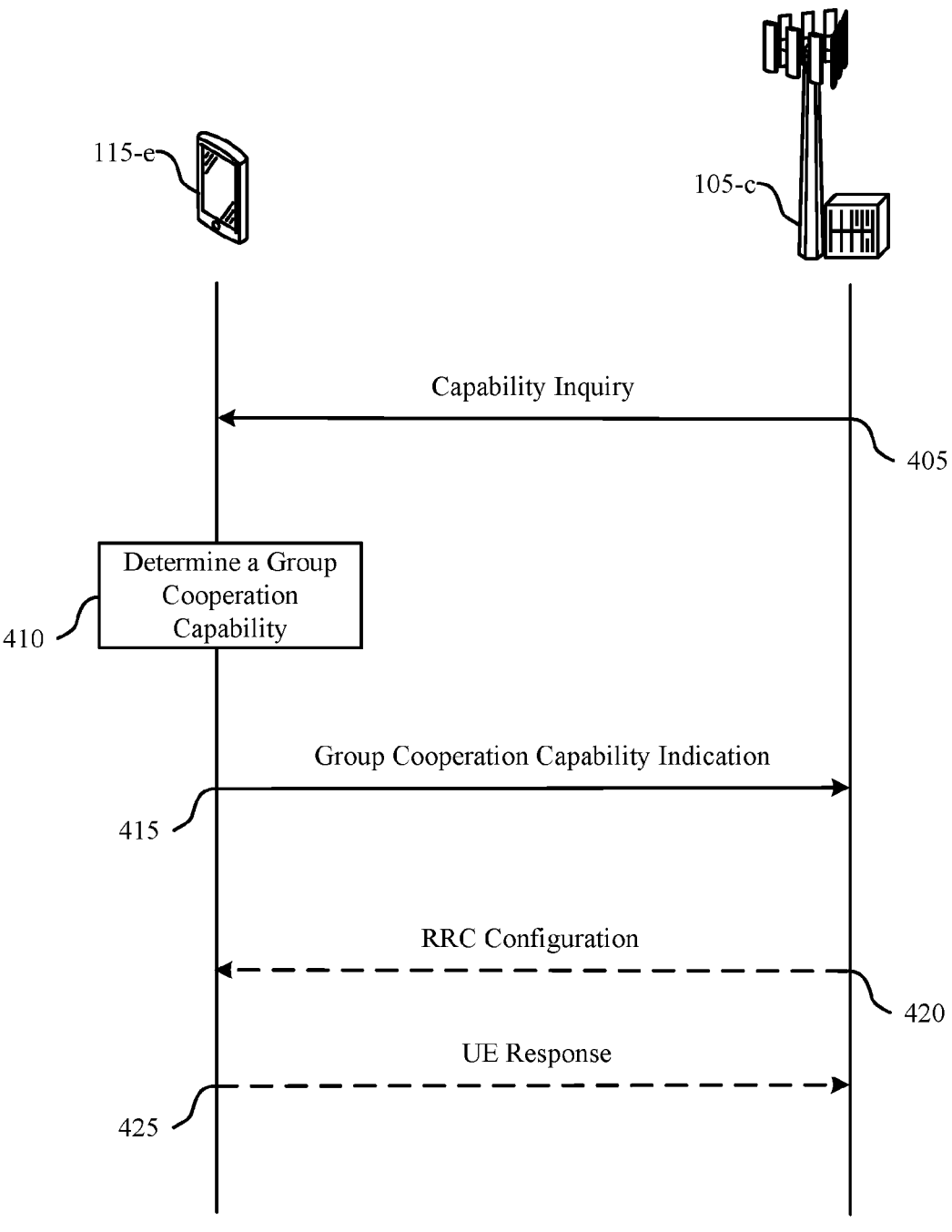
FIG. 4 illustrates an example of a process flow that supports capability reporting based on wireless device cooperation in accordance with aspects of the present disclosure.

FIG. 4 illustrates an example of a process flow 400 that supports capability reporting based on wireless device cooperation in accordance with aspects of the present disclosure. Process flow 400 may include base station 105-*c*, which may be an example of a base station 105 as described with respect to FIGS. 1 through 3. Base station 105-*c* may also be an example of a TRP. Process flow 400 also includes UE 115-*e*, which may be an example of a UE 115 as described with respect to FIGS. 1 through 3. UE 115-*e* may operate in a cooperative manner with one or more other UEs 115. UE 115-*e* and base station 105-*c* may communicate as part of a wireless communications system. UE 115-*e* and base station 105-*c* may perform the communications described with response to process flow 300 along with the communications described with respect to process flow 400, or perform either the communications of process flow 300 or the communications of process flow 400, or a combination thereof.

At 405, UE 115-*e* may receive one or more capability request messages from base station 105-*c*.

At 410, UE 115-*e* may determine a group cooperation capability of UE 115-*e* based on a group cooperation status of UE 115-*e*. The group cooperation status may be based on UE 115-*e* operating in cooperation with a group of UEs 115 for communicating with base station 105-*c*. UE 115-*e* may determine that UE 115-*e* is operating in cooperation with one or more UEs 115 of the group of UEs 115 for communicating with base station 105-*c*, where the group cooperation capability of UE 115-*e* corresponds to operating in cooperation with one or more UEs 115. UE 115-*e* may determine that UE 115-*e* and the one or more UEs 115 operate as a set of distributed panels.

At 415, UE 115-*e* may transmit, to base station 105-*c*, a group cooperation capability indication. UE 115-*e* may transmit the group cooperation capability indication in response to the capability request message received from base station 105-*c*.

At 420, UE 115-*e* may receive, from base station 105-*c*, a first RRC configuration. The first RRC configuration may be associated with the group cooperation capability of UE 115-*e*. For example, the first RRC configuration may be associated with UE 115-*e* operating non-cooperatively with the group of UEs 115. The first RRC configuration may, in some cases, include a first time alignment expiration timer.

At 420 UE 115-*e* may also receive, from base station 105-*c*, a second RRC configuration. The second RRC configuration may be associated with the group cooperation capability of UE 115-*e*. For example, the second RRC configuration may correspond to UE 115-*e* operating cooperatively with the group of UEs 115. The second RRC configuration may, in some cases, include a second time alignment expiration timer different from the first time alignment expiration timer.

In some cases, at 425, UE 115-*e* may report a first failure report in accordance with a first failure reporting procedure that may be based on the first RRC control configuration. At 425 UE 115-*e* may also report a second failure report in accordance with a second failure reporting procedure that may be based on the second RRC configuration. A first failure corresponding to the second RRC configuration may be reported in resources corresponding to the first RRC configuration.

In some cases, at 425, UE 115-*e* may transmit a request to enable or disable one or more parameters for communicating with base station 105-*c*. The request may be based on the group cooperation capability of UE 115-*e*. UE 115-*e* may also transmit the request to activate or deactivate a subset of the set of panels of UE 115-*e*. UE 115-*e* may transmit the request to activate or deactivate a subset of a set of supported carriers (e.g., component carriers) of UE 115-*e*, where UE 115-*e* may operate in accordance with a multiple component carrier scheme. These requests may be transmitted via layer 1, 2, or 3 signaling. In the case of layer 1 signaling, the request may include a failure report corresponding to an uplink control transmission, a random access transmission, or both. In the case of layer 2 signaling, the request may include a MAC-CE report for panel activation, panel deactivation, or a combination of these. In the case of layer 3, signaling, the request may include UE assistance information.

Figure 5:
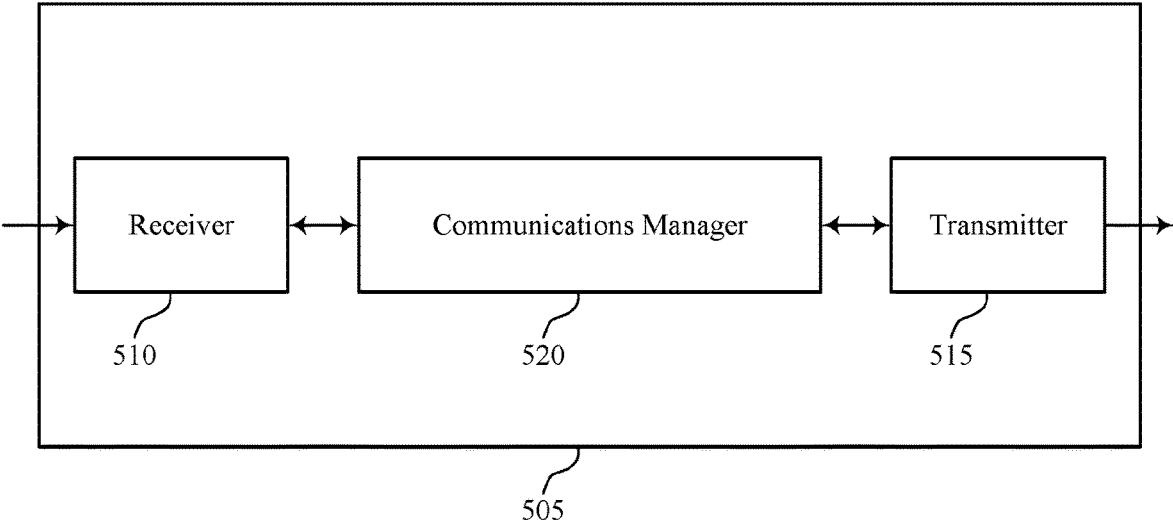
FIGS. 5 and 6 show block diagrams of devices that support capability reporting based on wireless device cooperation in accordance with aspects of the present disclosure.

FIG. 5 shows a block diagram 500 of a device 505 that supports capability reporting based on wireless device cooperation in accordance with aspects of the present disclosure.

The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to capability reporting based on wireless device cooperation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to capability reporting based on wireless device cooperation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of capability reporting based on wireless device cooperation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving one or more capability request messages from a base station. The communications manager 520 may be configured as or otherwise support a means for determining a group cooperation capability of the UE based on a group cooperation status of the UE, where the group cooperation status is based on the UE operating in cooperation with a group of UEs for communicating with the base station. The communications manager 520 may be configured as or otherwise support a means for transmitting, to the base station and in response to at least one of the one or more capability request messages, one or more messages indicating the group cooperation capability of the UE based on the determination.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improving communications efficiency at a device 505, by allowing device 505 to more frequently report communications capabilities to improve overall network efficiency.

Figure 6:
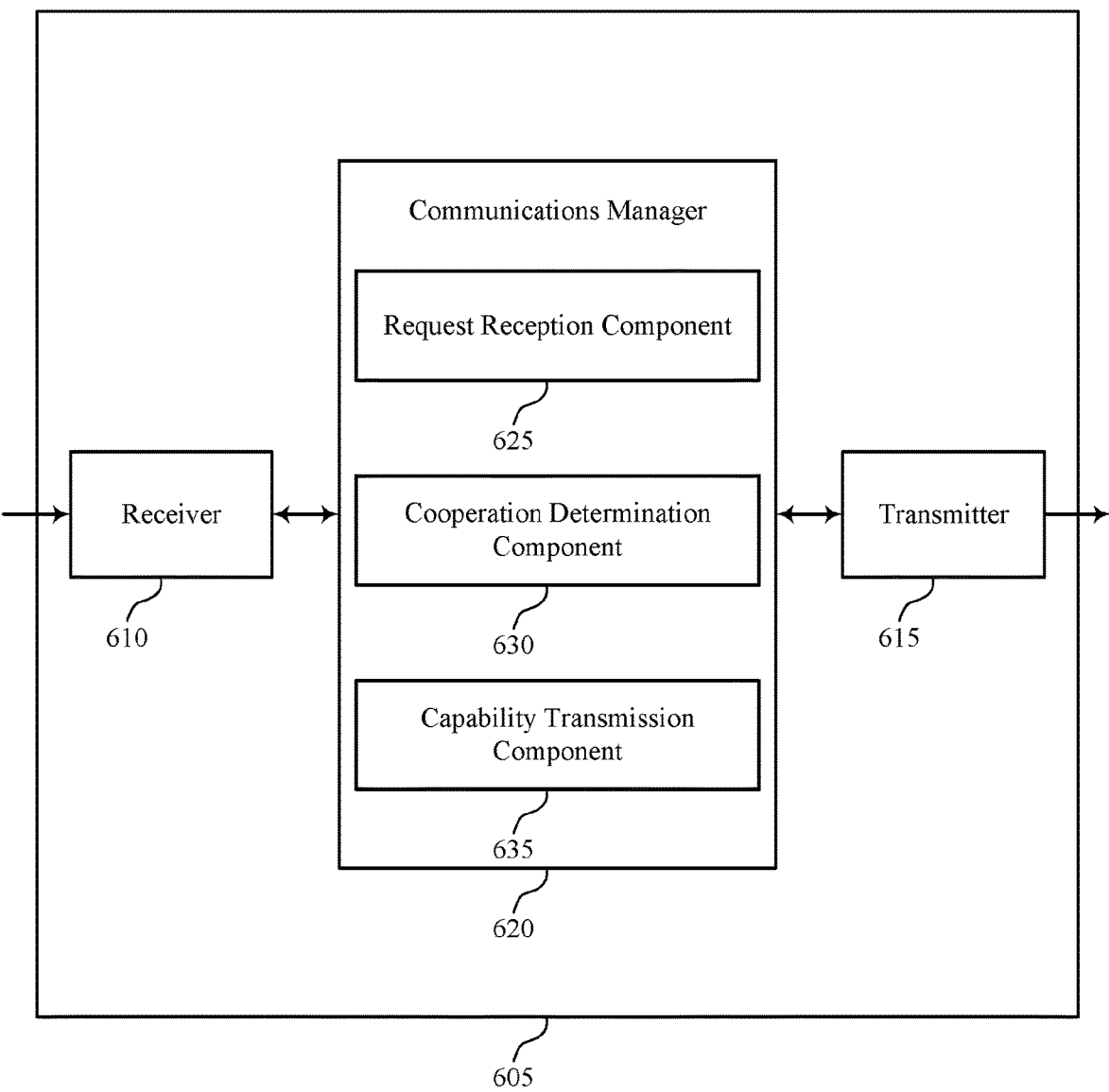

FIG. 6 shows a block diagram 600 of a device 605 that supports capability reporting based on wireless device cooperation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to capability reporting based on wireless device cooperation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to capability reporting based on wireless device cooperation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of capability reporting based on wireless device cooperation as described herein. For example, the communications manager 620 may include a request reception component 625, a cooperation determination component 630, a capability transmission component 635, or any combination thereof.

The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The request reception component 625 may be configured as or otherwise support a means for receiving one or more capability request messages from a base station. The cooperation determination component 630 may be configured as or otherwise support a means for determining a group cooperation capability of the UE based on a group cooperation status of the UE, where the group cooperation status is based on the UE operating in cooperation with a group of UEs for communicating with the base station. The capability transmission component 635 may be configured as or otherwise support a means for transmitting, to the base station and in response to at least one of the one or more capability request messages, one or more messages indicating the group cooperation capability of the UE based on the determination.

Figure 7:
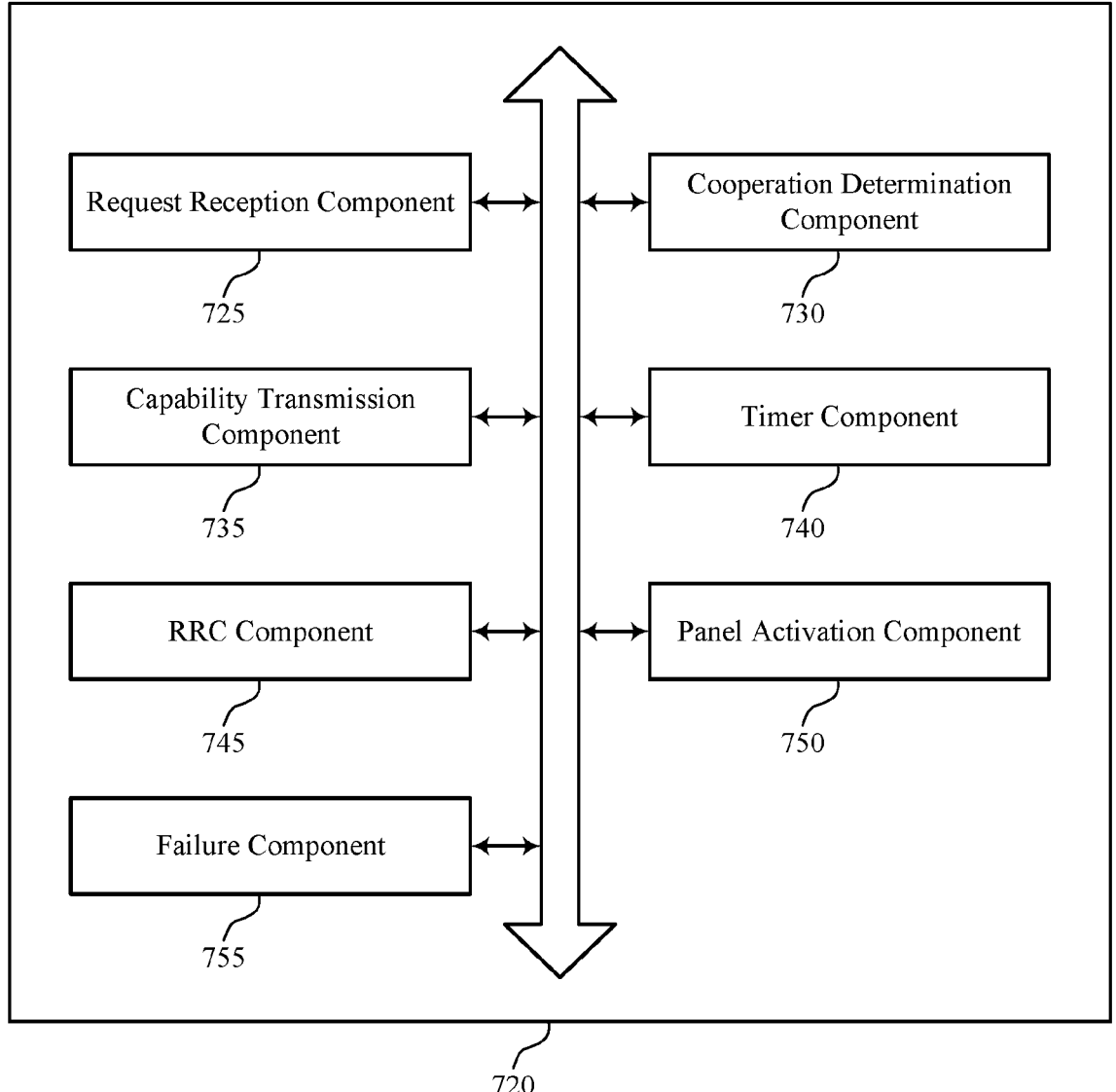
FIG. 7 shows a block diagram of a communications manager that supports capability reporting based on wireless device cooperation in accordance with aspects of the present disclosure.

FIG. 7 shows a block diagram 700 of a communications manager 720 that supports capability reporting based on wireless device cooperation in accordance with aspects of the present disclosure. The communications manager 720 may be an example of aspects of a communications manager 520, a communications manager 620, or both, as described herein. The communications manager 720, or various components thereof, may be an example of means for performing various aspects of capability reporting based on wireless device cooperation as described herein. For example, the communications manager 720 may include a request reception component 725, a cooperation determination component 730, a capability transmission component 735, a timer component 740, an RRC component 745, a panel activation component 750, a failure component 755, or any combination thereof. Each of these components may communicate, directly or indirectly, with one another (e.g., via one or more buses).

The communications manager 720 may support wireless communications at a UE in accordance with examples as disclosed herein. The request reception component 725 may be configured as or otherwise support a means for receiving one or more capability request messages from a base station. The cooperation determination component 730 may be configured as or otherwise support a means for determining a group cooperation capability of the UE based on a group cooperation status of the UE, where the group cooperation status is based on the UE operating in cooperation with a group of UEs for communicating with the base station. The capability transmission component 735 may be configured as or otherwise support a means for transmitting, to the base station and in response to at least one of the one or more capability request messages, one or more messages indicating the group cooperation capability of the UE based on the determination.

In some examples, to support transmitting the one or more messages indicating the group cooperation capability of the UE, the capability transmission component 735 may be configured as or otherwise support a means for transmitting, at a first time, a first message indicating a first group cooperation capability of the UE. In some examples, to support transmitting the one or more messages indicating the group cooperation capability of the UE, the capability transmission component 735 may be configured as or otherwise support a means for transmitting, at a second time different from the first time, a second message indicating a second group cooperation capability of the UE, the second group cooperation capability being different from the first group cooperation capability based on the group cooperation status of the UE.

In some examples, the first group cooperation capability is based on the group cooperation status corresponding to the UE operating non-cooperatively with the group of UEs. In some examples, the second group cooperation capability is based on the group cooperation status corresponding to the UE operating cooperatively with at least one UE of the group of UEs.

In some examples, the capability transmission component 735 may be configured as or otherwise support a means for transmitting, within the one or more messages, an indication of a varying capability indicator based on the group cooperation status of the UE, where the varying capability indicator indicates to the base station that the group cooperation capability of the UE varies over time.

In some examples, the request reception component 725 may be configured as or otherwise support a means for receiving one or more additional capability request messages from the base station based on transmitting the indication of the varying capability indicator.

In some examples, the timer component 740 may be configured as or otherwise support a means for identifying an expiration timer associated with the group cooperation capability of the UE based on the group cooperation status of the UE. In some examples, the timer component 740 may be configured as or otherwise support a means for transmitting, within the one or more messages, an indication of the expiration timer.

In some examples, the request reception component 725 may be configured as or otherwise support a means for receiving a second capability request from the base station based on an expiration of the expiration timer.

In some examples, the request reception component 725 may be configured as or otherwise support a means for receiving a second capability request message from the base station, where the second capability request message includes an indication for the UE to transmit the one or more messages indicating the group cooperation capability of the UE periodically. In some examples, the capability transmission component 735 may be configured as or otherwise support a means for transmitting the one or more messages indicating the group cooperation capability of the UE, where the one or more messages are transmitted periodically based on receiving the second capability request message.

In some examples, the RRC component 745 may be configured as or otherwise support a means for receiving, from the base station, a first RRC configuration, where the first RRC configuration is associated with the group cooperation capability of the UE corresponding to the UE operating non-cooperatively with the group of UEs. In some examples, the RRC component 745 may be configured as or otherwise support a means for receiving, from the base station, a second RRC configuration, where the second RRC configuration is associated with the group cooperation capability of the UE corresponding to the UE operating cooperatively with the group of UEs. In some examples, the first RRC configuration includes a first time alignment expiration timer and the second RRC configuration includes a second time alignment expiration timer different from the first time alignment expiration timer.

In some examples, the failure component 755 may be configured as or otherwise support a means for reporting a first failure report in accordance with a first failure reporting procedure that is based on the first RRC configuration. In some examples, the failure component 755 may be configured as or otherwise support a means for reporting a second failure report in accordance with a second failure reporting procedure that is based on the second RRC configuration. In some examples, a failure corresponding to the second RRC configuration is reported in resources corresponding to the first RRC configuration.

In some examples, to support determining the group cooperation capability of the UE, the cooperation determination component 730 may be configured as or otherwise support a means for determining that the UE is operating in cooperation with one or more UEs of the group of UEs for communicating with the base station, where the group cooperation capability of the UE corresponds to operating in cooperation with one or more UEs.

In some examples, to support determining that the UE is operating in cooperation with the one or more UEs, the cooperation determination component 730 may be configured as or otherwise support a means for determining that the UE and the one or more UEs operate as a set of distributed panels.

In some examples, the panel activation component 750 may be configured as or otherwise support a means for transmitting, to the base station, a request to enable or disable one or more parameters for communicating with the base station, where the request is based on the group cooperation capability of the UE.

In some examples, to support transmitting the request, the panel activation component 750 may be configured as or otherwise support a means for transmitting the request to activate or deactivate a subset of a set of panels of the UE.

In some examples, to support transmitting the request, the panel activation component 750 may be configured as or otherwise support a means for transmitting the request to activate or deactivate a subset of a set of supported carriers of the UE, where the UE operating in accordance with a multiple carrier communications scheme. In some examples, the request is transmitted via L3 signaling to the base station, and the request may include UE assistance information.

In some examples, the request is transmitted via L2 signaling to the base station, and the request may include a MAC-CE report for panel activation, panel deactivation, or any combination thereof.

In some examples, the request is transmitted via L1 signaling to the base station, and the request may include a cooperation failure report corresponding to an uplink control transmission, a random access transmission (e.g., a random access channel (RACH) transmission), or any combination thereof.

Figure 8:
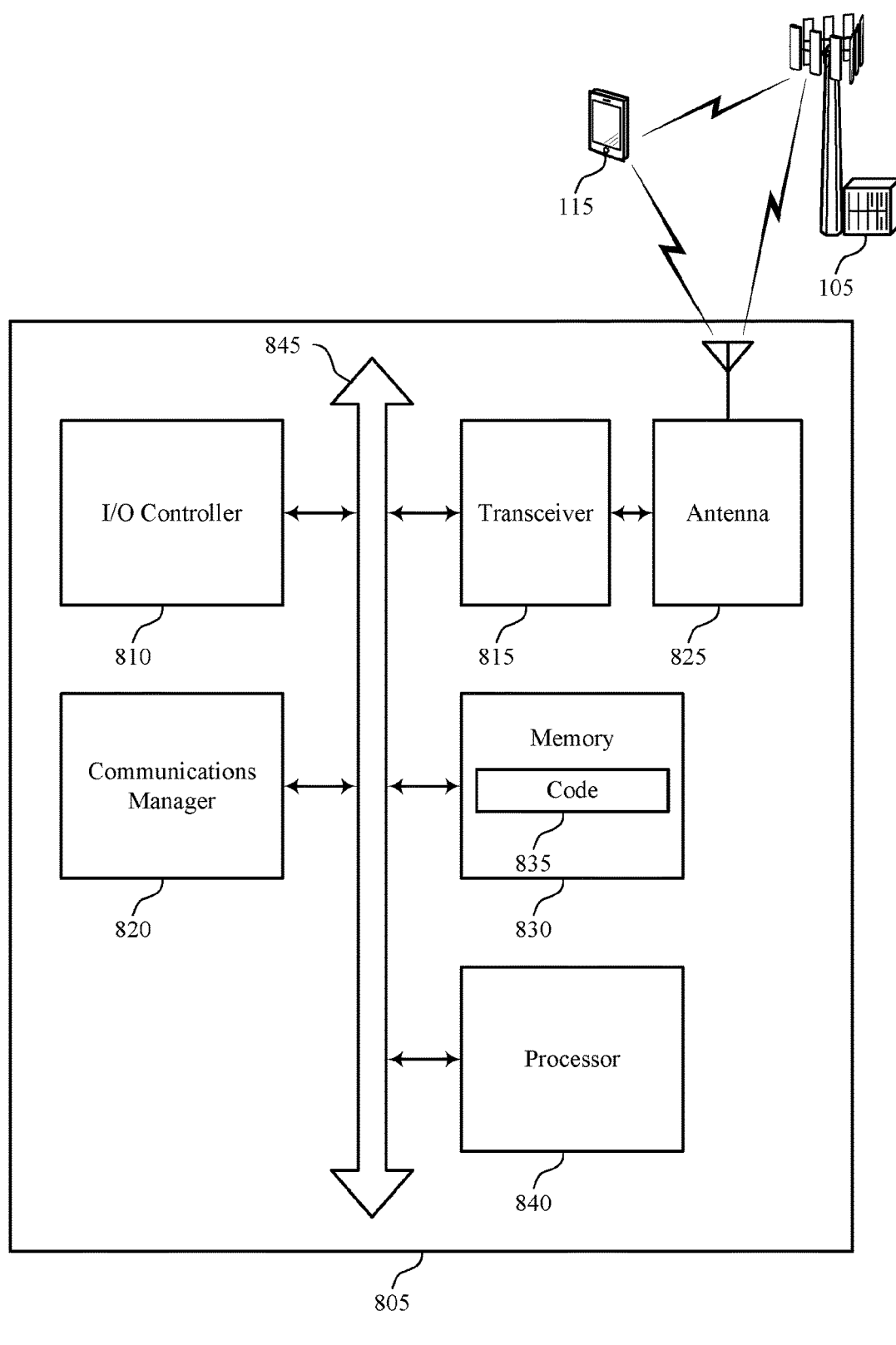
FIG. 8 shows a diagram of a system including a device that supports capability reporting based on wireless device cooperation in accordance with aspects of the present disclosure.

FIG. 8 shows a diagram of a system 800 including a device 805 that supports capability reporting based on wireless device cooperation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting capability reporting based on wireless device cooperation). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving one or more capability request messages from a base station. The communications manager 820 may be configured as or otherwise support a means for determining a group cooperation capability of the UE based on a group cooperation status of the UE, where the group cooperation status is based on the UE operating in cooperation with a group of UEs for communicating with the base station. The communications manager 820 may be configured as or otherwise support a means for transmitting, to the base station and in response to at least one of the one or more capability request messages, one or more messages indicating the group cooperation capability of the UE based on the determination.

By including or configuring the communications manager 820 in accordance with examples as described herein, the device 805 may support techniques for reducing power consumption to allow a device 805 to receive control signaling in accordance with accurate capabilities of the device 805 (e.g., based on the device 805 cooperating with one or more other devices), rather than based on previous or expired information. Efficiencies in communications at the device 805 may thus be improved, thereby saving power or increasing throughput, or both.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of capability reporting based on wireless device cooperation as described herein, or the processor 840 and the memory 830 may be otherwise configured to perform or support such operations.

Figure 9:
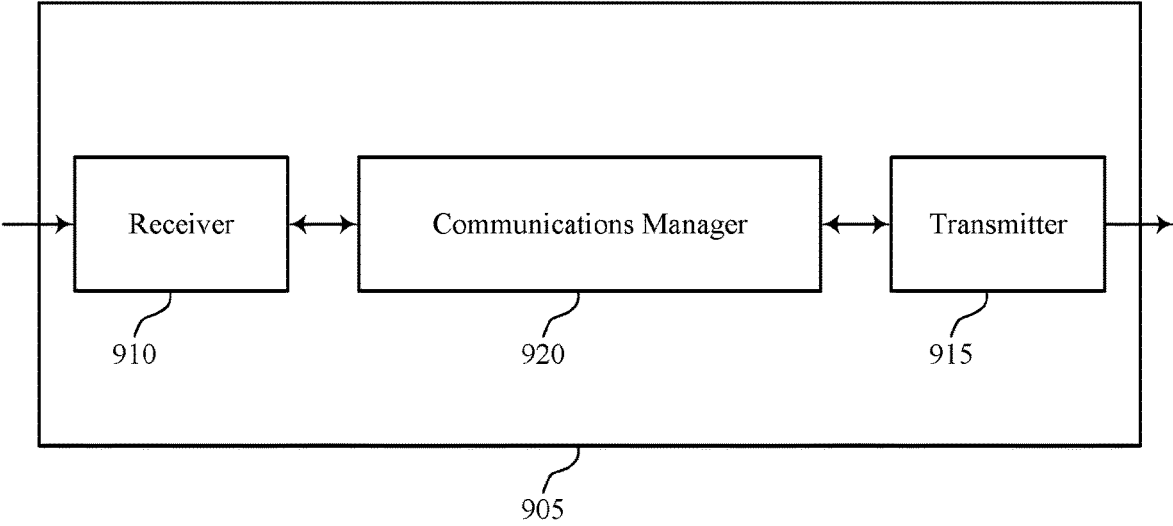
FIGS. 9 and 10 show block diagrams of devices that support capability reporting based on wireless device cooperation in accordance with aspects of the present disclosure.

FIG. 9 shows a block diagram 900 of a device 905 that supports capability reporting based on wireless device cooperation in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to capability reporting based on wireless device cooperation). Information may be passed on to other components of the device 905. The receiver 910 may utilize a single antenna or a set of multiple antennas.

The transmitter 915 may provide a means for transmitting signals generated by other components of the device 905.

For example, the transmitter 915 may transmit information such as packets, user data, control information, or any combination thereof associated with various information channels (e.g., control channels, data channels, information channels related to capability reporting based on wireless device cooperation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of capability reporting based on wireless device cooperation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting a capability request message to a UE. The communications manager 920 may be configured as or otherwise support a means for receiving, from the UE and in response to the capability request message, one or more messages indicating a group cooperation capability of the UE, where the group cooperation capability of the UE is based on a group cooperation status of the UE and indicates whether UE is operating in cooperation with a group of UEs for communicating with the base station.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources. The device 905 may communicate with other devices based on dynamically updated capabilities information, streamlining communication resources and reducing unnecessary communications, or signaling based on expired information.

Figure 10:
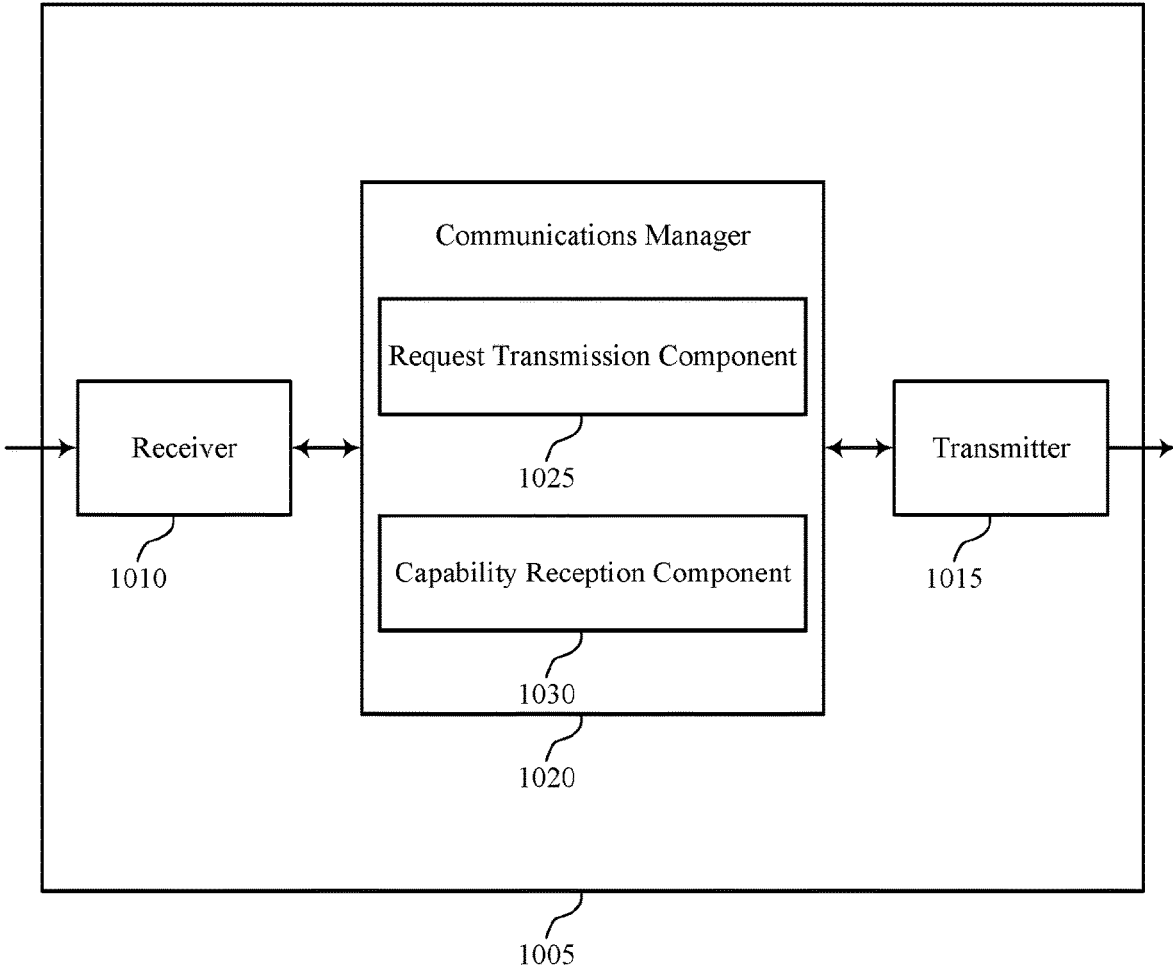

FIG. 10 shows a block diagram 1000 of a device 1005 that supports capability reporting based on wireless device cooperation in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to capability reporting based on wireless device cooperation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to capability reporting based on wireless device cooperation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of capability reporting based on wireless device cooperation as described herein. For example, the communications manager 1020 may include a request transmission component 1025 a capability reception component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The request transmission component 1025 may be configured as or otherwise support a means for transmitting a capability request message to a UE. The capability reception component 1030 may be configured as or otherwise support a means for receiving, from the UE and in response to the capability request message, one or more messages indicating a group cooperation capability of the UE, where the group cooperation capability of the UE is based on a group cooperation status of the UE and indicates whether UE is operating in cooperation with a group of UEs for communicating with the base station.

Figure 11:
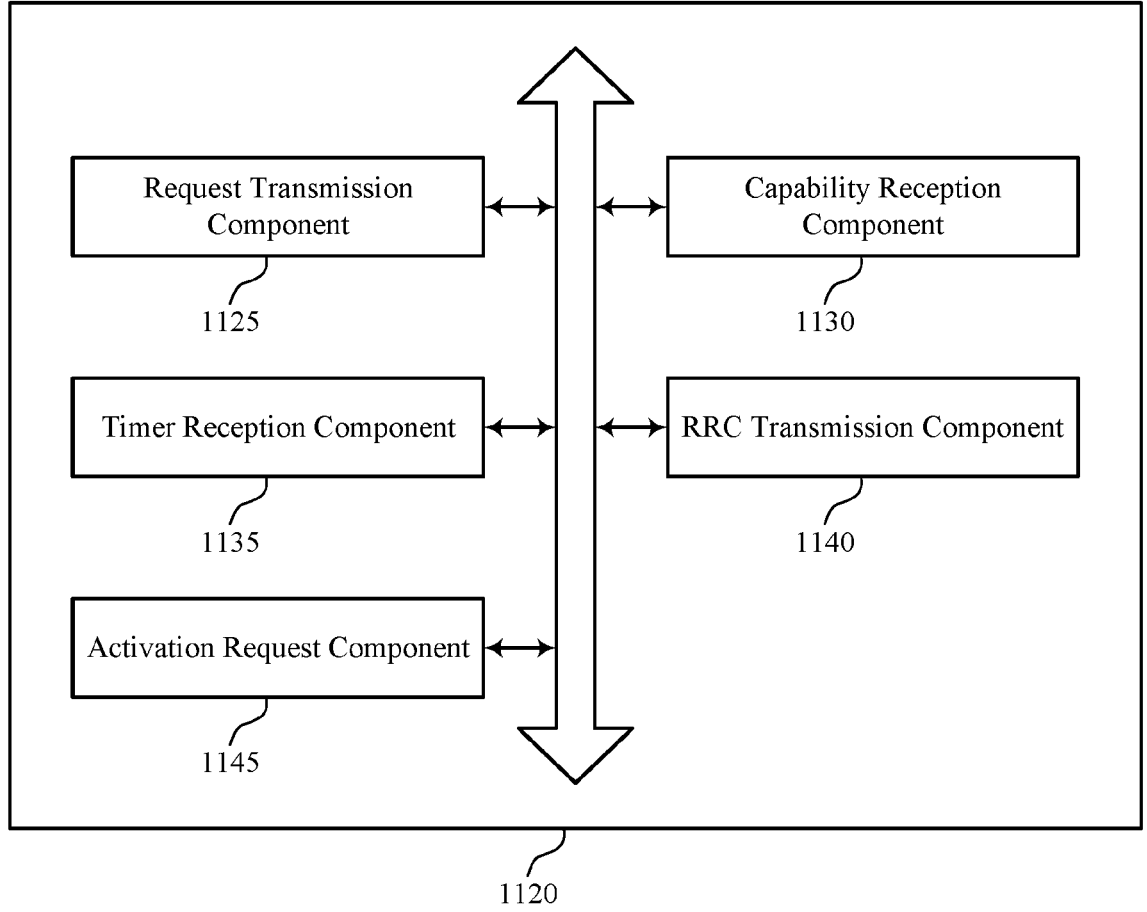
FIG. 11 shows a block diagram of a communications manager that supports capability reporting based on wireless device cooperation in accordance with aspects of the present disclosure.

FIG. 11 shows a block diagram 1100 of a communications manager 1120 that supports capability reporting based on wireless device cooperation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of capability reporting based on wireless device cooperation as described herein. For example, the communications manager 1120 may include a request transmission component 1125, a capability reception component 1130, a timer reception component 1135, an RRC transmission component 1140, an activation request component 1145, or any combination thereof. Each of these components may communicate, directly or indirectly, with one another (e.g., via one or more buses).

The communications manager 1120 may support wireless communications at a base station in accordance with examples as disclosed herein. The request transmission component 1125 may be configured as or otherwise support a means for transmitting a capability request message to a UE. The capability reception component 1130 may be configured as or otherwise support a means for receiving, from the UE and in response to the capability request message, one or more messages indicating a group cooperation capability of the UE, where the group cooperation capability of the UE is based on a group cooperation status of the UE and indicates whether UE is operating in cooperation with a group of UEs for communicating with the base station.

In some examples, to support receiving the one or more messages indicating the group cooperation capability of the UE, the capability reception component 1130 may be configured as or otherwise support a means for receiving, at a first time, a first message indicating a first group cooperation capability of the UE. In some examples, to support receiving the one or more messages indicating the group cooperation capability of the UE, the capability reception component 1130 may be configured as or otherwise support a means for receiving, at a second time different from the first time, a second message indicating a second group cooperation capability of the UE, the second group cooperation capability being different from the first group cooperation capability based on the group cooperation status of the UE.

In some examples, the first group cooperation capability is based on the group cooperation status corresponding to the UE operating non-cooperatively with the group of UEs. In some examples, the second group cooperation capability is based on the group cooperation status corresponding to the UE operating cooperatively with at least one UE of the group of UEs.

In some examples, the capability reception component 1130 may be configured as or otherwise support a means for receiving, within the one or more messages, an indication of a varying capability indicator based on the group cooperation status of the UE, where the varying capability indicator indicates to the base station that the group cooperation capability of the UE varies over time. In some examples, the request transmission component 1125 may be configured as or otherwise support a means for transmitting one or more additional capability request messages to the UE based on the varying capability indicator.

In some examples, the timer reception component 1135 may be configured as or otherwise support a means for receiving, within the one or more messages, an indication of an expiration timer corresponding to the group cooperation capability of the UE based on the group cooperation status of the UE. In some examples, the request transmission component 1125 may be configured as or otherwise support a means for transmitting a second capability request to the UE based on an expiration of the expiration timer.

In some examples, the request transmission component 1125 may be configured as or otherwise support a means for transmitting a second capability request message to the UE, where the second capability request message includes an indication for the UE to transmit the one or more messages indicating the group cooperation capability of the UE periodically. In some examples, the request transmission component 1125 may be configured as or otherwise support a means for receiving the one or more messages indicating the group cooperation capability of the UE, where the one or more messages are received periodically based on transmitting the second capability request message.

In some examples, the RRC transmission component 1140 may be configured as or otherwise support a means for transmitting, to the UE, a first RRC configuration, where the first RRC configuration is associated with the group cooperation capability of the UE corresponding to the UE operating non-cooperatively with the group of UEs. In some examples, the RRC transmission component 1140 may be configured as or otherwise support a means for transmitting, to the UE, a second RRC configuration, where the second RRC configuration is associated with the group cooperation capability of the UE corresponding to the UE operating cooperatively with the group of UEs, where the first RRC configuration includes a first time alignment expiration timer and the second RRC configuration includes a second time alignment expiration timer different from the first time alignment expiration timer.

In some examples, the activation request component 1145 may be configured as or otherwise support a means for receiving, from the UE, a request to enable or disable one or more parameters for communicating with the UE, where the request is based on the group cooperation capability of the UE.

Figure 12:
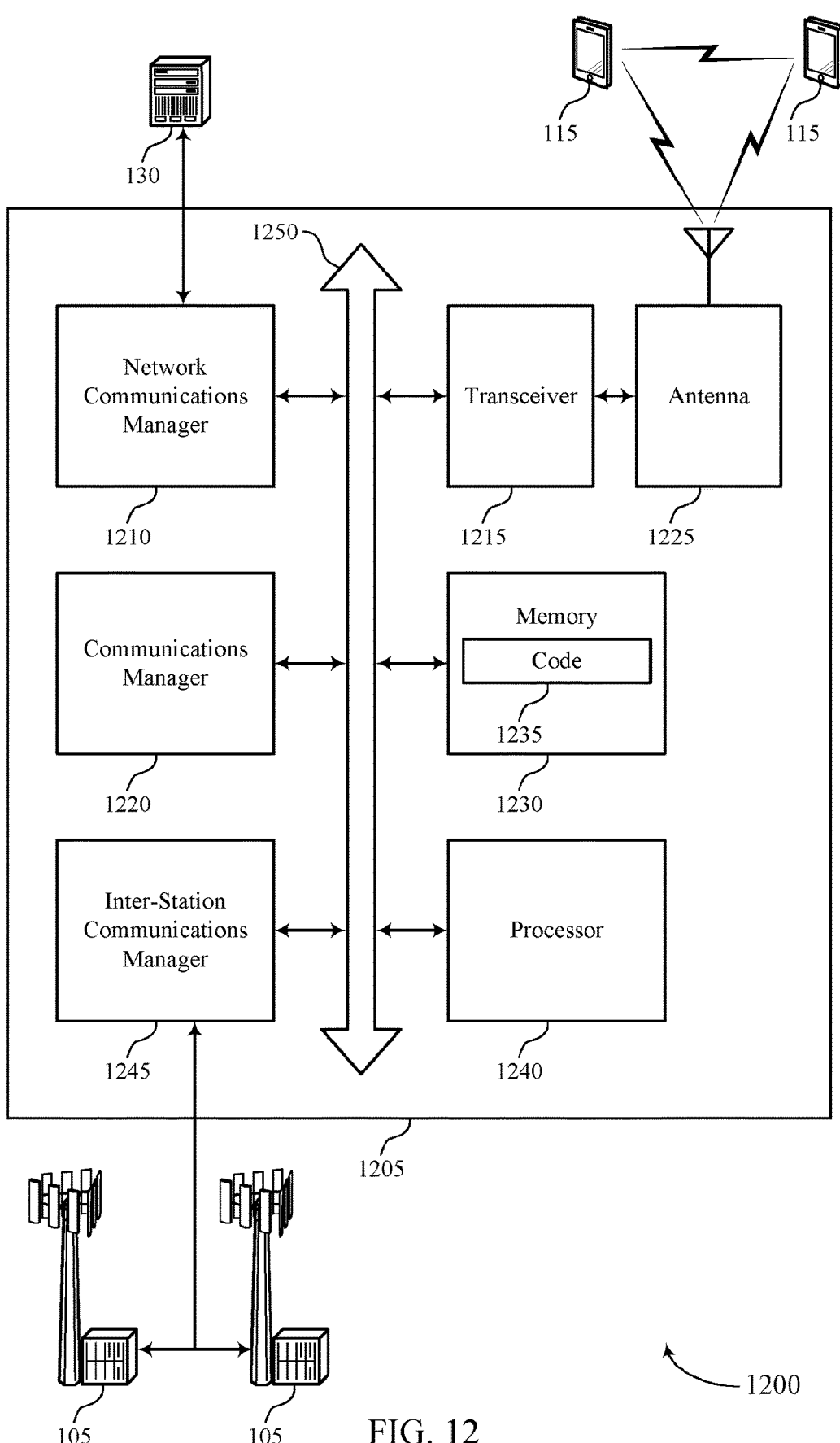
FIG. 12 shows a diagram of a system including a device that supports capability reporting based on wireless device cooperation in accordance with aspects of the present disclosure.

FIG. 12 shows a diagram of a system 1200 including a device 1205 that supports capability reporting based on wireless device cooperation in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting capability reporting based on wireless device cooperation). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting a capability request message to a UE. The communications manager 1220 may be configured as or otherwise support a means for receiving, from the UE and in response to the capability request message, one or more messages indicating a group cooperation capability of the UE, where the group cooperation capability of the UE is based on a group cooperation status of the UE and indicates whether UE is operating in cooperation with a group of UEs for communicating with the base station.

By including or configuring the communications manager 1220 in accordance with examples as described herein, the device 1205 may support techniques for improved coordination between devices in a wireless communications network. The device 1205 may communicate with other devices more efficiently, and based on dynamically updated capability information of the devices in the network.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of capability reporting based on wireless device cooperation as described herein, or the processor 1240 and the memory 1230 may be otherwise configured to perform or support such operations.

FIG. 13 shows a flowchart illustrating a method 1300 that supports capability reporting based on wireless device cooperation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving one or more capability request messages from a base station. The operations of 1305 may be performed in accordance with examples as disclosed herein. In some examples, aspects of the operations of 1305 may be performed by a request reception component 725 as described with reference to FIG. 7.

At 1310, the method may include determining a group cooperation capability of the UE based on a group cooperation status of the UE, where the group cooperation status is based on the UE operating in cooperation with a group of UEs for communicating with the base station. The operations of 1310 may be performed in accordance with examples as disclosed herein. In some examples, aspects of the operations of 1310 may be performed by a cooperation determination component 730 as described with reference to FIG. 7.

At 1315, the method may include transmitting, to the base station and in response to at least one of the one or more capability request messages, one or more messages indicating the group cooperation capability of the UE based on the determination. The operations of 1315 may be performed in accordance with examples as disclosed herein. In some examples, aspects of the operations of 1315 may be performed by a capability transmission component 735 as described with reference to FIG. 7.

FIG. 14 shows a flowchart illustrating a method 1400 that supports capability reporting based on wireless device cooperation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving one or more capability request messages from a base station. The operations of 1405 may be performed in accordance with examples as disclosed herein. In some examples, aspects of the operations of 1405 may be performed by a request reception component 725 as described with reference to FIG. 7.

At 1410, the method may include determining a group cooperation capability of the UE based on a group cooperation status of the UE, where the group cooperation status is based on the UE operating in cooperation with a group of UEs for communicating with the base station. The operations of 1410 may be performed in accordance with examples as disclosed herein. In some examples, aspects of the operations of 1410 may be performed by a cooperation determination component 730 as described with reference to FIG. 7.

At 1415, the method may include transmitting, at a first time, a first message indicating a first group cooperation capability of the UE based on the determination. The operations of 1415 may be performed in accordance with examples as disclosed herein. In some examples, aspects of the operations of 1415 may be performed by a capability transmission component 735 as described with reference to FIG. 7.

At 1420, the method may include transmitting, at a second time different from the first time, a second message indicating a second group cooperation capability of the UE, the second group cooperation capability being different from the first group cooperation capability based on the group cooperation status of the UE. The operations of 1420 may be performed in accordance with examples as disclosed herein. In some examples, aspects of the operations of 1420 may be performed by a capability transmission component 735 as described with reference to FIG. 7.

FIG. 15 shows a flowchart illustrating a method 1500 that supports capability reporting based on wireless device cooperation in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving one or more capability request messages from a base station. The operations of 1505 may be performed in accordance with examples as disclosed herein. In some examples, aspects of the operations of 1505 may be performed by a request reception component 725 as described with reference to FIG. 7.

At 1510, the method may include determining a group cooperation capability of the UE based on a group cooperation status of the UE, where the group cooperation status is based on the UE operating in cooperation with a group of UEs for communicating with the base station. The operations of 1510 may be performed in accordance with examples as disclosed herein. In some examples, aspects of the operations of 1510 may be performed by a cooperation determination component 730 as described with reference to FIG. 7.

At 1515, the method may include identifying an expiration timer associated with the group cooperation capability of the UE based on the group cooperation status of the UE. The operations of 1515 may be performed in accordance with examples as disclosed herein. In some examples, aspects of the operations of 1515 may be performed by a timer component 740 as described with reference to FIG. 7.

At 1520, the method may include transmitting, to the base station and in response to at least one of the one or more capability request messages, one or more messages indicating the group cooperation capability of the UE based on the determination. The operations of 1520 may be performed in accordance with examples as disclosed herein. In some examples, aspects of the operations of 1520 may be performed by a capability transmission component 735 as described with reference to FIG. 7.

At 1525, the method may include transmitting, within the one or more messages, an indication of the expiration timer. The operations of 1525 may be performed in accordance with examples as disclosed herein. In some examples, aspects of the operations of 1525 may be performed by a timer component 740 as described with reference to FIG. 7.

Figure 16:
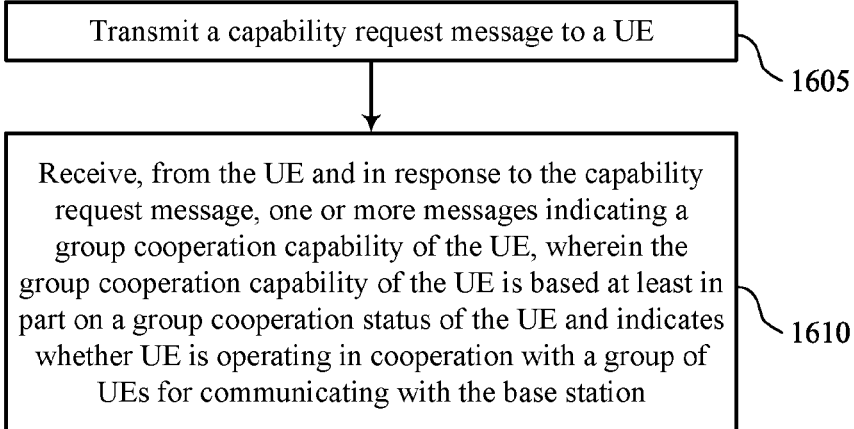

FIG. 16 shows a flowchart illustrating a method 1600 that supports capability reporting based on wireless device cooperation in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting a capability request message to a UE. The operations of 1605 may be performed in accordance with examples as disclosed herein. In some examples, aspects of the operations of 1605 may be performed by a request transmission component 1125 as described with reference to FIG. 11.

At 1610, the method may include receiving, from the UE and in response to the capability request message, one or more messages indicating a group cooperation capability of the UE, where the group cooperation capability of the UE is based on a group cooperation status of the UE and indicates whether UE is operating in cooperation with a group of UEs for communicating with the base station. The operations of 1610 may be performed in accordance with examples as disclosed herein. In some examples, aspects of the operations of 1610 may be performed by a capability reception component 1130 as described with reference to FIG. 11.

The following provides an overview of aspects of the present disclosure:

Aspect 1: A method for wireless communications at a UE, comprising: receiving one or more capability request messages from a base station; determining a group cooperation capability of the UE based at least in part on a group cooperation status of the UE, wherein the group cooperation status is based at least in part on the UE operating in cooperation with a group of UEs for communicating with the base station; and transmitting, to the base station and in response to at least one of the one or more capability request messages, one or more messages indicating the group cooperation capability of the UE based at least in part on the determination.

Aspect 2: The method of aspect 1, wherein transmitting the one or more messages indicating the group cooperation capability of the UE comprises: transmitting, at a first time, a first message indicating a first group cooperation capability of the UE; and transmitting, at a second time different from the first time, a second message indicating a second group cooperation capability of the UE, the second group cooperation capability being different from the first group cooperation capability based at least in part on the group cooperation status of the UE.

Aspect 3: The method of aspect 2, wherein the first group cooperation capability is based at least in part on the group cooperation status corresponding to the UE operating non-cooperatively with the group of UEs; and the second group cooperation capability is based at least in part on the group cooperation status corresponding to the UE operating cooperatively with at least one UE of the group of UEs.

Aspect 4: The method of any of aspects 1 through 3, further comprising: transmitting, within the one or more messages, an indication of a varying capability indicator based at least in part on the group cooperation status of the UE, wherein the varying capability indicator indicates to the base station that the group cooperation capability of the UE varies over time.

Aspect 5: The method of aspect 4, further comprising: receiving one or more additional capability request messages from the base station based at least in part on transmitting the indication of the varying capability indicator.

Aspect 6: The method of any of aspects 1 through 5, further comprising: identifying an expiration timer associated with the group cooperation capability of the UE based at least in part on the group cooperation status of the UE; and transmitting, within the one or more messages, an indication of the expiration timer.

Aspect 7: The method of aspect 6, further comprising: receiving a second capability request from the base station based at least in part on an expiration of the expiration timer.

Aspect 8: The method of any of aspects 1 through 7, further comprising: receiving a second capability request message from the base station, wherein the second capability request message comprises an indication for the UE to transmit the one or more messages indicating the group cooperation capability of the UE periodically; and transmitting the one or more messages indicating the group cooperation capability of the UE, wherein the one or more messages are transmitted periodically based at least in part on receiving the second capability request message.

Aspect 9: The method of any of aspects 1 through 8, further comprising: receiving, from the base station, a first RRC configuration, wherein the first RRC configuration is associated with the group cooperation capability of the UE corresponding to the UE operating non-cooperatively with the group of UEs; and receiving, from the base station, a second RRC configuration, wherein the second RRC configuration is associated with the group cooperation capability of the UE corresponding to the UE operating cooperatively with the group of UEs.

Aspect 10: The method of aspect 9, wherein the first RRC configuration comprises a first time alignment expiration timer and the second RRC configuration comprises a second time alignment expiration timer different from the first time alignment expiration timer.

Aspect 11: The method of aspect 10, further comprising: reporting a first failure report in accordance with a first failure reporting procedure that is based at least in part on the first RRC configuration; and reporting a second failure report in accordance with a second failure reporting procedure that is based at least in part on the second RRC configuration.

Aspect 12: The method of any of aspects 10 through 11, wherein a failure corresponding to the second RRC configuration is reported in resources corresponding to the first RRC configuration.

Aspect 13: The method of any of aspects 1 through 12, wherein determining the group cooperation capability of the UE comprises: determining that the UE is operating in cooperation with one or more UEs of the group of UEs for communicating with the base station, wherein the group cooperation capability of the UE corresponds to operating in cooperation with one or more UEs.

Aspect 14: The method of aspect 13, wherein determining that the UE is operating in cooperation with the one or more UEs comprises: determining that the UE and the one or more UEs operate as a set of distributed panels.

Aspect 15: The method of any of aspects 1 through 14, further comprising: transmitting, to the base station, a request to enable or disable one or more parameters for communicating with the base station, wherein the request is based at least in part on the group cooperation capability of the UE.

Aspect 16: The method of aspect 15, wherein transmitting the request comprises: transmitting the request to activate or deactivate a subset of a set of panels of the UE.

Aspect 17: The method of any of aspects 15 through 16, wherein transmitting the request comprises: transmitting the request to activate or deactivate a subset of a set of supported carriers of the UE, wherein the UE operating in accordance with a multiple carrier communications scheme.

Aspect 18: The method of any of aspects 15 through 17, wherein the request is transmitted via layer 3 signaling to the base station, the request comprising UE assistance information.

Aspect 19: The method of any of aspects 15 through 18, wherein the request is transmitted via layer 2 signaling to the base station, the request comprising a medium access channel control element report for panel activation, panel deactivation, or any combination thereof.

Aspect 20: The method of any of aspects 15 through 19, wherein the request is transmitted via layer 1 signaling to the base station, the request comprising a cooperation failure report corresponding to an uplink control transmission, a random access transmission, or any combination thereof.

Aspect 21: A method for wireless communications at a base station, comprising: transmitting a capability request message to a UE; receiving, from the UE and in response to the capability request message, one or more messages indicating a group cooperation capability of the UE, wherein the group cooperation capability of the UE is based at least in part on a group cooperation status of the UE and indicates whether UE is operating in cooperation with a group of UEs for communicating with the base station.

Aspect 22: The method of aspect 21, wherein receiving the one or more messages indicating the group cooperation capability of the UE comprises: receiving, at a first time, a first message indicating a first group cooperation capability of the UE; and receiving, at a second time different from the first time, a second message indicating a second group cooperation capability of the UE, the second group cooperation capability being different from the first group cooperation capability based at least in part on the group cooperation status of the UE.

Aspect 23: The method of aspect 22, wherein the first group cooperation capability is based at least in part on the group cooperation status corresponding to the UE operating non-cooperatively with the group of UEs, and the second group cooperation capability is based at least in part on the group cooperation status corresponding to the UE operating cooperatively with at least one UE of the group of UEs.

Aspect 24: The method of any of aspects 21 through 23, further comprising: receiving, within the one or more messages, an indication of a varying capability indicator based at least in part on the group cooperation status of the UE, wherein the varying capability indicator indicates to the base station that the group cooperation capability of the UE varies over time; and transmitting one or more additional capability request messages to the UE based at least in part on the varying capability indicator.

Aspect 25: The method of any of aspects 21 through 24, further comprising: receiving, within the one or more messages, an indication of an expiration timer corresponding to the group cooperation capability of the UE based at least in part on the group cooperation status of the UE; and transmitting a second capability request to the UE based at least in part on an expiration of the expiration timer.

Aspect 26: The method of any of aspects 21 through 25, further comprising: transmitting a second capability request message to the UE, wherein the second capability request message comprises an indication for the UE to transmit the one or more messages indicating the group cooperation capability of the UE periodically; and receiving the one or more messages indicating the group cooperation capability of the UE, wherein the one or more messages are received periodically based at least in part on transmitting the second capability request message.

Aspect 27: The method of any of aspects 21 through 26, further comprising: transmitting, to the UE, a first RRC configuration, wherein the first RRC configuration is associated with the group cooperation capability of the UE corresponding to the UE operating non-cooperatively with the group of UEs; and transmitting, to the UE, a second RRC configuration, wherein the second RRC configuration is associated with the group cooperation capability of the UE corresponding to the UE operating cooperatively with the group of UEs, wherein the first RRC configuration comprises a first time alignment expiration timer and the second RRC configuration comprises a second time alignment expiration timer different from the first time alignment expiration timer.

Aspect 28: The method of any of aspects 21 through 27, further comprising: receiving, from the UE, a request to enable or disable one or more parameters for communicating with the UE, wherein the request is based at least in part on the group cooperation capability of the UE.

Aspect 29: An apparatus for wireless communications at a UE, comprising a processor; memory coupled with the processor; and instructions stored in the memory and executable by the processor to cause the apparatus to perform a method of any of aspects 1 through 20.

Aspect 30: An apparatus for wireless communications at a UE, comprising at least one means for performing a method of any of aspects 1 through 20.

Aspect 31: A non-transitory computer-readable medium storing code for wireless communications at a UE, the code comprising instructions executable by a processor to perform a method of any of aspects 1 through 20.

Aspect 32: An apparatus for wireless communications at a base station, comprising a processor; memory coupled with the processor; and instructions stored in the memory and executable by the processor to cause the apparatus to perform a method of any of aspects 21 through 28.

Aspect 33: An apparatus for wireless communications at a base station, comprising at least one means for performing a method of any of aspects 21 through 28.

Aspect 34: A non-transitory computer-readable medium storing code for wireless communications at a base station, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving one or more capability request messages from a base station;

determining a group cooperation capability of the UE based at least in part on a group cooperation status of the UE, wherein the group cooperation status is based at least in part on the UE operating in cooperation with a group of UEs for communicating with the base station; and transmitting, to the base station and in response to at least one of the one or more capability request messages, one or more messages indicating the group cooperation capability of the UE based at least in part on the determination.

2. The method of claim 1, wherein transmitting the one or more messages indicating the group cooperation capability of the UE comprises:

transmitting, at a first time, a first message indicating a first group cooperation capability of the UE; and transmitting, at a second time different from the first time, a second message indicating a second group cooperation capability of the UE, the second group cooperation capability being different from the first group cooperation capability based at least in part on the group cooperation status of the UE.

3. The method of claim 2, wherein:

the first group cooperation capability is based at least in part on the group cooperation status corresponding to the UE operating non-cooperatively with the group of UEs; and the second group cooperation capability is based at least in part on the group cooperation status corresponding to the UE operating cooperatively with at least one UE of the group of UEs.

4. The method of claim 1, further comprising:

transmitting, within the one or more messages, an indication of a varying capability indicator based at least in part on the group cooperation status of the UE, wherein the varying capability indicator indicates to the base station that the group cooperation capability of the UE varies over time.

5. The method of claim 4, further comprising:

receiving one or more additional capability request messages from the base station based at least in part on transmitting the indication of the varying capability indicator.

6. The method of claim 1, further comprising:

identifying an expiration timer associated with the group cooperation capability of the UE based at least in part on the group cooperation status of the UE; and transmitting, within the one or more messages, an indication of the expiration timer.

7. The method of claim 6, further comprising:

receiving a second capability request from the base station based at least in part on an expiration of the expiration timer.

8. The method of claim 1, further comprising:

receiving a second capability request message from the base station, wherein the second capability request message comprises an indication for the UE to transmit the one or more messages indicating the group cooperation capability of the UE periodically; and transmitting the one or more messages indicating the group cooperation capability of the UE, wherein the one or more messages are transmitted periodically based at least in part on receiving the second capability request message.

9. The method of claim 1, further comprising:

receiving, from the base station, a first radio resource control configuration, wherein the first radio resource control configuration is associated with the group cooperation capability of the UE corresponding to the UE operating non-cooperatively with the group of UEs; and receiving, from the base station, a second radio resource control configuration, wherein the second radio resource control configuration is associated with the group cooperation capability of the UE corresponding to the UE operating cooperatively with the group of UEs.

10. The method of claim 9, wherein the first radio resource control configuration comprises a first time alignment expiration timer and the second radio resource control configuration comprises a second time alignment expiration timer different from the first time alignment expiration timer.

11. The method of claim 10, further comprising:

reporting a first failure report in accordance with a first failure reporting procedure that is based at least in part on the first radio resource control configuration; and reporting a second failure report in accordance with a second failure reporting procedure that is based at least in part on the second radio resource control configuration.

12. The method of claim 10, wherein a failure corresponding to the second radio resource control configuration is reported in resources corresponding to the first radio resource control configuration.

13. The method of claim 1, wherein determining the group cooperation capability of the UE comprises:

determining that the UE is operating in cooperation with one or more UEs of the group of UEs for communicating with the base station, wherein the group cooperation capability of the UE corresponds to operating in cooperation with one or more UEs.

14. The method of claim 13, wherein determining that the UE is operating in cooperation with the one or more UEs comprises:

determining that the UE and the one or more UEs operate as a set of distributed panels.

15. The method of claim 1, further comprising:

transmitting, to the base station, a request to enable or disable one or more parameters for communicating with the base station, wherein the request is based at least in part on the group cooperation capability of the UE.

16. The method of claim 15, wherein transmitting the request comprises:

transmitting the request to activate or deactivate a subset of a set of panels of the UE.

17. The method of claim 15, wherein transmitting the request comprises:

transmitting the request to activate or deactivate a subset of a set of supported carriers of the UE, wherein the UE operating in accordance with a multiple carrier communications scheme.

18. The method of claim 15, wherein the request is transmitted via layer 3 signaling to the base station, the request comprising UE assistance information.

19. The method of claim 15, wherein the request is transmitted via layer 2 signaling to the base station, the request comprising a medium access channel control element report for panel activation, panel deactivation, or any combination thereof.

20. The method of claim 15, wherein the request is transmitted via layer 1 signaling to the base station, the request comprising a cooperation failure report corresponding to an uplink control transmission, a random access transmission, or any combination thereof.

21. A method for wireless communications at a base station, comprising:

transmitting a capability request message to a user equipment (UE);

receiving, from the UE and in response to the capability request message, one or more messages indicating a group cooperation capability of the UE, wherein the group cooperation capability of the UE is based at least in part on a group cooperation status of the UE and indicates whether UE is operating in cooperation with a group of UEs for communicating with the base station.

22. The method of claim 21, wherein receiving the one or more messages indicating the group cooperation capability of the UE comprises:

receiving, at a first time, a first message indicating a first group cooperation capability of the UE; and receiving, at a second time different from the first time, a second message indicating a second group cooperation capability of the UE, the second group cooperation capability being different from the first group cooperation capability based at least in part on the group cooperation status of the UE.

23. The method of claim 22, wherein:

the first group cooperation capability is based at least in part on the group cooperation status corresponding to the UE operating non-cooperatively with the group of UEs, and the second group cooperation capability is based at least in part on the group cooperation status corresponding to the UE operating cooperatively with at least one UE of the group of UEs.

24. The method of claim 21, further comprising:

receiving, within the one or more messages, an indication of a varying capability indicator based at least in part on the group cooperation status of the UE, wherein the varying capability indicator indicates to the base station that the group cooperation capability of the UE varies over time; and transmitting one or more additional capability request messages to the UE based at least in part on the varying capability indicator.

25. The method of claim 21, further comprising:

receiving, within the one or more messages, an indication of an expiration timer corresponding to the group cooperation capability of the UE based at least in part on the group cooperation status of the UE; and transmitting a second capability request to the UE based at least in part on an expiration of the expiration timer.

26. The method of claim 21, further comprising:

transmitting a second capability request message to the UE, wherein the second capability request message comprises an indication for the UE to transmit the one or more messages indicating the group cooperation capability of the UE periodically; and receiving the one or more messages indicating the group cooperation capability of the UE, wherein the one or more messages are received periodically based at least in part on transmitting the second capability request message.

27. The method of claim 21, further comprising:

transmitting, to the UE, a first radio resource control configuration, wherein the first radio resource control configuration is associated with the group cooperation capability of the UE corresponding to the UE operating non-cooperatively with the group of UEs; and transmitting, to the UE, a second radio resource control configuration, wherein the second radio resource control configuration is associated with the group cooperation capability of the UE corresponding to the UE operating cooperatively with the group of UEs, wherein the first radio resource control configuration comprises a first time alignment expiration timer and the second radio resource control configuration comprises a second time alignment expiration timer different from the first time alignment expiration timer.

28. The method of claim 21, further comprising:

receiving, from the UE, a request to enable or disable one or more parameters for communicating with the UE, wherein the request is based at least in part on the group cooperation capability of the UE.

29. An apparatus for wireless communications at a user equipment (UE), comprising:

a processor;

memory coupled with the processor; and instructions stored in the memory and executable by the processor to cause the apparatus to:

receive one or more capability request messages from a base station;

determine a group cooperation capability of the UE based at least in part on a group cooperation status of the UE, wherein the group cooperation status is based at least in part on the UE operating in cooperation with a group of UEs for communicating with the base station; and transmit, to the base station and in response to at least one of the one or more capability request messages, one or more messages indicating the group cooperation capability of the UE based at least in part on the determination.

30. An apparatus for wireless communications at a base station, comprising:

a processor;

memory coupled with the processor; and instructions stored in the memory and executable by the processor to cause the apparatus to:

transmit a capability request message to a user equipment (UE);

receive, from the UE and in response to the capability request message, one or more messages indicating a group cooperation capability of the UE, wherein the group cooperation capability of the UE is based at least in part on a group cooperation status of the UE and indicates whether UE is operating in cooperation with a group of UEs for communicating with the base station.

* * * * *